(12) United States Patent
Tu et al.

(10) Patent No.: US 9,491,458 B2
(45) Date of Patent: Nov. 8, 2016

(54) SCALABLE VIDEO CODING PREDICTION WITH NON-CAUSAL INFORMATION

(71) Applicant: QUALCOMM Incorporated, San Diego, CA (US)

(72) Inventors: Chengjie Tu, San Diego, CA (US); Xianglin Wang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 862 days.

(21) Appl. No.: 13/860,491

(22) Filed: Apr. 10, 2013

(65) Prior Publication Data

US 2013/0272411 A1 Oct. 17, 2013

Related U.S. Application Data

(60) Provisional application No. 61/623,513, filed on Apr. 12, 2012, provisional application No. 61/707,615, filed on Sep. 28, 2012.

(51) Int. Cl.
H04N 7/12 (2006.01)
H04N 19/51 (2014.01)
H04N 19/105 (2014.01)
(Continued)

(52) U.S. Cl.
CPC ...... *H04N 19/00587* (2013.01); *H04N 19/105* (2014.11); *H04N 19/147* (2014.11); *H04N 19/176* (2014.11); *H04N 19/187* (2014.11); *H04N 19/30* (2014.11); *H04N 19/11* (2014.11);

(Continued)

(58) Field of Classification Search
CPC .. H04N 19/105; H04N 19/112; H04N 9/176; H04N 19/513; H04N 19/00018; H04N 19/159; H04N 19/13; H04N 19/147; H04N 19/00587; H04N 19/176; H04N 19/187; H04N 19/30; H04N 19/33
USPC .................................. 375/240.01–240.29
See application file for complete search history.

(56) References Cited

U.S. PATENT DOCUMENTS 7,627,034 B2 12/2009 Park et al.
7,847,861 B2 12/2010 Zhai et al.
(Continued)

FOREIGN PATENT DOCUMENTS

EP 1914996 A2 4/2008

OTHER PUBLICATIONS

Brass B., et al., "WD4: Working Draft 4 of High Efficiency Video Coding", Output Document of JCT-VC, Doc. No. JCTVC-F803d, Torino, Jul. 2011, 229 Pages.

(Continued)

*Primary Examiner* — Gims Philippe
(74) *Attorney, Agent, or Firm* — Knobbe, Martens, Olson & Bear, LLP

(57) ABSTRACT

Prediction information for a current block in an enhancement layer may be determined based at least in part on base layer information obtained by coding a base block in a base layer beneath the enhancement layer. This base block may occur in a position in the base layer such that it is co-located with a non-causal block in the enhancement layer (e.g., a block that occurs after the current block in the coding order of the enhancement layer). The prediction information determined for the current block may be used to code the current block (e.g., encoding or decoding the current block).

38 Claims, 12 Drawing Sheets

(51) Int. Cl.
  *H04N 19/176* (2014.01)
  *H04N 19/147* (2014.01)
  *H04N 19/30* (2014.01)
  *H04N 19/187* (2014.01)
  *H04N 19/52* (2014.01)
  *H04N 19/13* (2014.01)
  *H04N 19/11* (2014.01)
  *H04N 19/91* (2014.01)
  *H04N 19/33* (2014.01)

(52) U.S. Cl.
  CPC ............... *H04N 19/13* (2014.11); *H04N 19/33* (2014.11); *H04N 19/52* (2014.11); *H04N 19/91* (2014.11)

(56) References Cited

U.S. PATENT DOCUMENTS

| | | | |
|---|---|---|---|
| 7,903,735 | B2 | 3/2011 | Cha et al. |
| 7,978,770 | B2 | 7/2011 | Luo et al. |
| 8,111,745 | B2 | 2/2012 | Han et al. |
| 9,167,266 | B2* | 10/2015 | Francois ............ H04N 19/112 |
| 2006/0008003 | A1 | 1/2006 | Ji et al. |
| 2006/0104354 | A1* | 5/2006 | Han ............... H04N 19/159 375/240.03 |
| 2006/0120450 | A1* | 6/2006 | Han ............... H04N 19/176 375/240.03 |
| 2006/0153295 | A1 | 7/2006 | Wang et al. |
| 2006/0153300 | A1 | 7/2006 | Wang et al. |
| 2006/0176957 | A1 | 8/2006 | Han et al. |
| 2008/0260043 | A1* | 10/2008 | Bottreau ........... H04N 19/105 375/240.26 |
| 2008/0267291 | A1 | 10/2008 | Vieron et al. |
| 2009/0147848 | A1* | 6/2009 | Park ............... H04N 19/00018 375/240.13 |
| 2009/0220004 | A1 | 9/2009 | Cieplinski et al. |
| 2009/0323809 | A1 | 12/2009 | Raveendran |
| 2011/0075734 | A1 | 3/2011 | Sakazume |
| 2013/0107949 | A1* | 5/2013 | Sim ............... H04N 19/30 375/240.12 |
| 2013/0272402 | A1 | 10/2013 | Tu et al. |
| 2015/0071356 | A1* | 3/2015 | Kim ............... H04N 19/513 375/240.16 |

OTHER PUBLICATIONS

Li H., et al., "Fast Mode Decision for Spatial Scalable Video Coding", IEEE, 2006, pp. 3005-3008.

Anonymous: "Test Model under Consideration for High-Efficiency Video Coding", 92. MPEG Meeting; Apr. 19, 2010-Apr. 23, 2010; Dresden; (Motion Picture Expert Group or ISO/IEC JTC1/SC29/WG11), No. N11280, Jul. 28, 2010 (Jul. 28, 2010), XP030017777, ISSN: 0000-0029, pp. 152.

Chen J., et al., "Description of Scalable Video coding Technology Proposal by Qualcomm (Configuration 2)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-TSG.16); < URL: http://wftp3.itu.int/av-arch/jctvc-site/no.jvtcv-k0036 >, Oct. 2, 2012 (Oct. 2, 2012), XP030112968, pp. 1-22.

Lange R., "Extended inter-layer motion vectors prediction in scalable video coding—case study and improvement proposal", 18. JVT Meeting; 75. MPEG Meeting; Jan. 14, 2006-Jan. 20, 2006; Bangkok, TH; (Joint Video Team of ISO/IEC JTC1/SC29/WG11 and ITU-TSG.16), No. JVT-R094, Jan. 17, 2006 (Jan. 17, 2006), XP030006361, ISSN: 0000-0410; pp. 1-20.

Laroche G., et al., "RD Optimized Coding for Motion Vector Predictor Selection",IEEE Transaction on Circuits and Systems for Video Technology, IEEE Service Center, Piscataway, NJ, US, vol. 18 (9), Sep. 1, 2008 (Sep. 1, 2008), pp. 1247-1257, XP011231739, ISSN: 1051-8215, DOI: 10.1109/TCSVT.2008.92882.

Lin J.L., et al., "Improved Advanced Motion Vector Prediction," 4. JCT-VC Meeting; 95. MPEG Meeting; Jan. 20, 2001-Jan. 28, 2001; MEGU; (Joint Collaborative Team on Video Coding of ISO/IEC JTC1/SC29/WG11and ITU-T SG. 16); <URL: http://wftp3.itu.int/av-arch/jc tvc-site/>, No. JCTVC -D125, Jan. 15, 2011 (Jan. 15, 2011), XP030008165, ISSN: 0000-0015; pp. 1-8.

Martin Aurelie et al., "Atomic decomposition dedicated to AVC and spatial SVC prediction", IEEE International Conference on Image Processing, Oct. 12, 2008 (Oct. 12, 2008), pp. 2492-2495, XP031374546, ISBN: 978-1-4244-1765-0.

Park Chun-Su et al., "Estimation-Based Interlayer Intra Prediction for Scalable Video Coding", IEEE Transactions on Circuits and Systems for Video Technology, vol. 19, No. 12, Jul. 7, 2009 (Jul. 7, 2009), pp. 1902-1907, XP011281910, ISSN: 1051-8215 DOI: 10.1109/TCSVT.2009.2026945.

Partial International Search Report—PCT/US2013/036165—ISA/EPO—Jul. 24, 2013.

Puri, et al., "Video Coding Using the H.264/Mpeg-4 Avc Compression Standard," Signal Processing Image Communication, Elsevier Science Publishers, Oct. 1, 2004, pp. 793-849, vol. 19 (9),Amsterdam, NL, XP004607150, ISSN: 0923-5965.

Reichel J., et al., Joint Scalable Video Model (JSVM) 4, 74. MPEG Meeting, (Oct. 17, 2005-Oct. 21, 2005), Nice, Motion Picture Expertgroup or ISO/IEC JTC1/SC29/WG11, No. N7556, Nov. 18, 2005, XP030014101, ISSN: 000-0344, Section 1.2.3.2. Inter Layer Motion Prediction; pp. 1-41.

Schwarz H et al: "Overview of the Scalable Video Coding Extension of the H.264/AVC Standard", IEEE Transactions on Circuits and Systems for Video Technology, Sep. 24, 2007 (Sep. 24, 2007), vol. 17, No. 9, pp. 1103-1120, XP011193019, ISSN: 1051-8215, DOI: 10/1109/TCSVT.2007.905532.

Yang H., et al., "Description of Scalable Video coding Technology Proposal by Huawei Technologies", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); <URL: http://wftp3.itu.int/av-arch/jctvc-site/no.jvtcv-k0046>, Oct. 2, 2012 (Oct. 2, 2012), XP030112978, Section 2.2.3.1 Retrieving motion information from base-layer; pp. 1-15.

International Search Report and Written Opinion—PCT/US2013/036165—ISA/EPO—Oct. 10, 2013.

* cited by examiner

SCALABLE VIDEO CODING PREDICTION WITH NON-CAUSAL INFORMATION

CROSS REFERENCE TO RELATED APPLICATION

This application claims a priority benefit under 35 U.S.C. §119(e) from U.S. Provisional Patent Application No. 61/707,615, filed Sep. 28, 2012, and from U.S. Provisional Patent Application No. 61/623,513, filed Apr. 12, 2012, both of which are incorporated by reference in their entireties.

TECHNICAL FIELD

This disclosure generally relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Some block-based video coding and compression schemes make use of scalable techniques, such as scalable video coding (SVC). Generally described, scalable video coding refers to video coding in which a base layer and one or more scalable enhancement layers are used. For SVC, a base layer typically carries video data with a base level of quality. One or more enhancement layers carry additional video data to support higher spatial, temporal, and/or quality (also referred to as signal-to-noise ratio or SNR) levels. In some cases, the base layer may be transmitted in a manner that is more reliable than the transmission of enhancement layers.

Each of these layers may include one or more video blocks, which may be coded in a particular coding order (e.g., coded sequentially left-to-right and line-by-line, top-to-bottom). Layers may have the same block size or varying block sizes, depending on the spatial resolution of the layer.

SUMMARY

Generally described, this disclosure pertains to techniques related to scalable video coding. As discussed above, scalable video coding is a video coding technique in which a base layer and one or more scalable enhancement layers are used.

In one embodiment, a method of decoding video data includes: in an enhancement layer comprising a plurality of blocks arranged in a coding order, identifying a current block and a non-causal block, wherein the non-causal block occurs after the current block in the coding order; determining prediction information of the current block using base layer information associated with a base block of a base layer; and decoding the current block using the prediction information, wherein the base block of the base layer is co-located with the non-causal block of the plurality of blocks of the enhancement layer, such that the base block occupies a position in the base layer that is substantially similar to a position occupied by the non-causal block in the enhancement layer.

In some examples, prediction information for a current block in an enhancement layer may be determined based at least in part on base layer information obtained by coding a base block in a base layer beneath the enhancement layer. The prediction information determined for the current block may optionally be used to code the current block (e.g., encoding or decoding the current block), or may be used for other purposes. The base block that is coded may occur in a position in the base layer such that it is co-located with a non-causal block in the enhancement layer (e.g., a block that occurs after the current block in a coding order of the enhancement layer).

The base layer block may provide information such as reconstructed pixel values for intra prediction of the current block; prediction angle information for intra prediction of the current block; motion field prediction for coding motion field information of the current block; and/or other types of information which may be used for coding the current block in the enhancement layer.

The base block from which the base layer information is obtained may belong to any layer beneath the enhancement layer. For example, the base block may occur in a layer immediately beneath the enhancement layer, or may occur in a layer that is two or more layers beneath the enhancement layer. In a particular, non-limiting example, a motion field predictor may be determined for the current block by obtaining base layer information from a coded base block that occurs two (or three, or four, or more) layers beneath the enhancement layer.

Further, the base block in the base layer that is co-located with the non-causal block in the enhancement layer need not be a "real" block. Rather, in some examples, the base layer block can be a derived block whose information is derived from other base layer blocks based on a spatial scaling ratio and/or other factors.

In yet another embodiment, a method of encoding video data includes: in an enhancement layer comprising a plurality of blocks arranged in a coding order, identifying a current block and a non-causal block, wherein the non-causal block occurs after the current block in the coding order; determining prediction information of the current block using base layer information associated with a base block of a base layer; and encoding the current block using the prediction information, wherein the base block of the base layer is co-located with the non-causal block of the plurality of blocks of the enhancement layer, such that the base block occupies a position in the base layer that is substantially similar to a position occupied by the non-causal block in the enhancement layer.

In yet another embodiment, a video coding device includes: a memory unit and a processor. The memory unit is configured to store: an enhancement layer comprising a current block and a non-causal block; and a base layer comprising a base block, wherein the base block of the base layer is co-located with the non-causal block of the enhancement layer such that the base block occupies a position in the base layer that is substantially similar to a position occupied by the non-causal block in the enhancement layer.

The processor is configured to determine prediction information of the current block using base layer information associated with a base block of a base layer; and code the current block using the prediction information.

In yet another embodiment, a computer program product that comprises one or more computer-readable storage media that store instructions that, when executed, cause one or more processors to: determine prediction information of a current block of an enhancement layer using base layer information associated with a base block of a base layer; and code the current block using the prediction information, wherein the base block of the base layer is co-located with a non-causal block of the enhancement layer such that the base block occupies a position in the base layer that is substantially similar to a position occupied by the non-causal block in the enhancement layer, and wherein the current block and non-causal block of the enhancement layer are arranged in a coding order, and wherein the non-causal block is positioned after the current block in the coding order.

In yet another embodiment, a video coding device for coding a current block of an enhancement layer that comprises the current block and a non-causal block, includes: means for identifying a current block and a non-causal block, wherein the current block and non-causal block are arranged in a coding order, and wherein the non-causal block is positioned after the current block in the coding order; means for determining prediction information of the current block of the enhancement layer using base layer information associated with a base block of a base layer; and means for coding the current block based at least in part on the prediction information; wherein the base block of the base layer is co-located with the non-causal block of the enhancement layer such that the base block occupies a position in the base layer that is substantially similar to a position occupied by the non-causal block in the enhancement layer.

In yet another embodiment, a method of decoding video data includes: in an enhancement layer comprising a plurality of blocks arranged in a coding order, identifying a current block and a non-causal block, wherein the non-causal block occurs after the current block in the coding order; selecting, using base layer information associated with a base block in a base layer, a context for entropy decoding information of the current block; and based at least in part on the selected context, entropy decoding the information of the current block, wherein the base block of the base layer is co-located with the non-causal block of the enhancement layer such that the base block occupies a position in the base layer that is substantially similar to a position occupied by the non-causal block in the enhancement layer.

In yet another embodiment, a method of encoding video data includes: in an enhancement layer comprising a plurality of blocks arranged in a coding order, identifying a current block and a non-causal block, wherein the non-causal block occurs after the current block in the coding order; selecting, using base layer information associated with a base block in a base layer, a context for entropy encoding information of the current block; and based at least in part on the selected context, entropy encoding the information of the current block, wherein the base block of the base layer is co-located with the non-causal block of the enhancement layer such that the base block occupies a position in the base layer that is substantially similar to a position occupied by the non-causal block in the enhancement layer.

In yet another embodiment, a video coding device includes: a memory unit and a processor. The memory unit is configured to store an enhancement layer comprising a current block and a non-causal block; and a base layer comprising a base block, wherein the base block of the base layer is co-located with the non-causal block of the enhancement layer such that the base block occupies a position in the base layer that is substantially similar to a position occupied by the non-causal block in the enhancement layer. The processor is in communication with the memory unit. The processor is configured to: select, based on base layer information associated with a base block in a base layer, a context for entropy coding information of the current block; and based at least in part on the selected context, entropy code the information of the current block.

In yet another embodiment, a computer program product comprises one or more computer-readable storage media that store instructions that, when executed, cause one or more processors to: from an enhancement layer comprising a plurality of blocks in a coding order, select a current block and a non-causal block, wherein the non-causal block occurs after the current block in the coding order; code a base block of a base layer to generate base layer information; select, based on base layer information of a base block of a base layer, a context for entropy coding information of the current block; and based at least in part on the selected context, entropy code the information of the current block; wherein the base block of the base layer is co-located with the non-causal block of the enhancement layer such that the base block occupies a position in the base layer that is substantially similar to a position occupied by the non-causal block in the enhancement layer.

In yet another embodiment, a video coding device includes: means for selecting, based on base layer information associated with a base block in a base layer, a context for entropy coding information of a current block in an enhancement layer; and means for entropy coding the information of the current block based at least in part on the selected context; wherein the base block of the base layer is co-located with the non-causal block of the enhancement layer such that the base block occupies a position in the base layer that is substantially similar to a position occupied by the non-causal block in the enhancement layer.

The details of one or more examples are set forth in the accompanying drawings and the description below. Other features, objects, and advantages will be apparent from the description and drawings, and from the claims.

DETAILED DESCRIPTION

Figure 1:
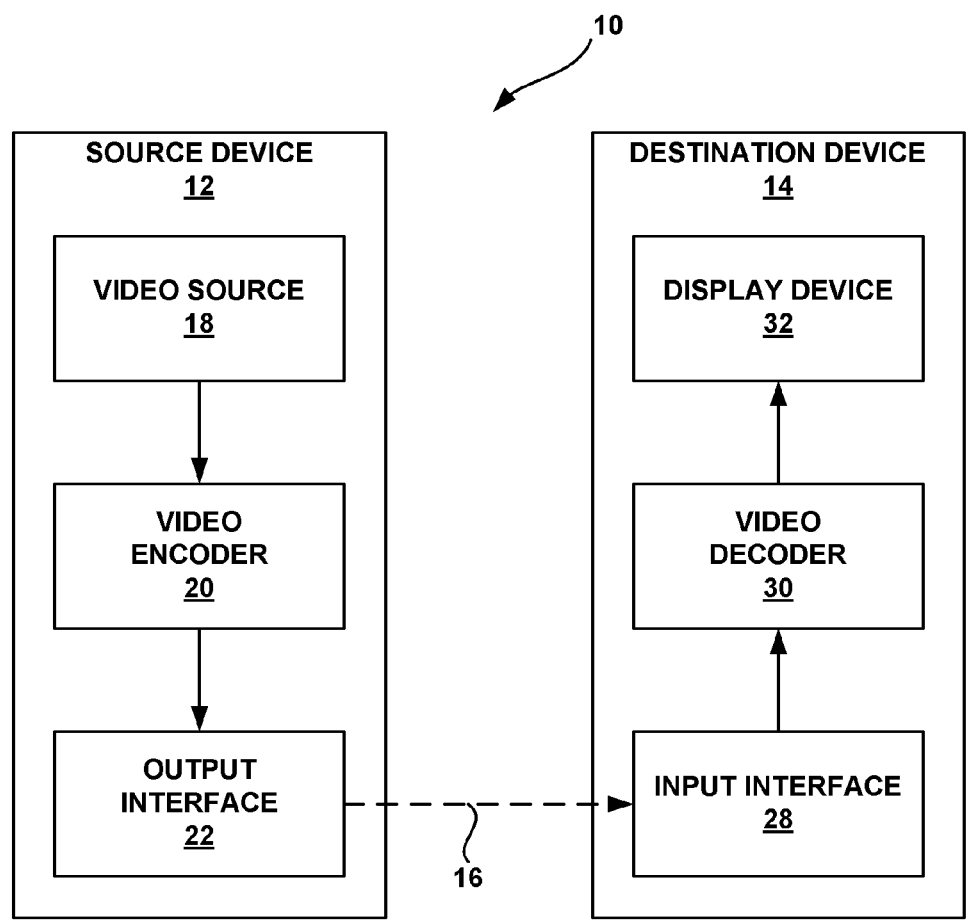
FIG. 1 is a block diagram illustrating an example video coding system that may utilize the techniques of this disclosure.

In scalable video coding, typically only a block collocated with a particular block at the current enhancement layer (e.g., a "current block") is used to predict the information of the current block. Non-causal blocks (e.g., blocks that have not yet been determined) for the collocated block at base layer are not used for coding the current block at the enhancement layer. However, because lower layers (e.g., base or reference layers with respect to the current or enhancement layer) are good approximations of the current layer, information from the lower layers can resemble the information in the current layer. Therefore, the non-causal or "future" information from such lower layers could be used to better predict and/or code the current block in scalable video coding schemes. If information from those blocks at a base layer is used to code or decode a current block, the coding efficiency for the current block at the enhancement layer may be improved.

Generally described, this disclosure pertains to video coding. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). The full citation for the HEVC Working Draft 7 is document HCTVC-11003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, $9^{th}$ Meeting: Geneva, Switzerland, Apr. 27, 2012 to May 7, 2012. Each of these references is incorporated by reference in its entirety.

More specifically, the techniques described in this disclosure generally relate to scalable video coding (SVC), though it will be recognized that these techniques may also be practiced with other techniques for video coding, examples of which are discussed above. For example, the techniques may be related to, and used with or within, a High Efficiency Video Coding (HEVC) scalable video coding (SVC) extension.

In an SVC extension, there may be multiple layers of video information. In some examples, an absolute base layer (i=0) and one or more scalable enhancement layers (i=1, 2, 3, etc.) may be provided. It will be recognized that an enhancement layer may serve as a base layer for higher enhancement layers. For example, an enhancement layer for which i=1 may serve as a base layer for an enhancement layer for which i=2, 3, 4, etc. Conversely, an enhancement layer may serve as an enhancement layer for any lower enhancement layer and the absolute base layer. For example, an enhancement layer for which i=2 may serve as an enhancement layer for the absolute base layer for which i=0 and for the enhancement layer for which i=1. In such an example, the enhancement layer for which i=1 may be considered to be a base layer for the enhancement layer for which i=2.

Scalable video coding (SVC) may be used to provide quality (also referred to as signal-to-noise (SNR)) scaling, spatial scaling and/or temporal scaling. An enhanced layer may have a different spatial resolution than that of the base layer. For example, the spatial aspect ratio between the enhancement layer and base layer can be 1.0, 1.5, 2.0, or any other ratios. In other words, the spatial aspect of the enhancement layer may equal 1.0, 1.5, or 2.0 times the spatial aspect of the base layer. In some examples, the scaling factor of the enhancement layer may be greater than the base layer. For example, the size of pictures in the enhancement layer may be greater than a size of pictures in the base layer. In this way, it may be possible, although not a limitation, that the spatial resolution of the enhancement layer is larger or otherwise different than the spatial resolution of the base layer.

For purposes of illustration only, the techniques described in the disclosure are described with examples including only two layers (e.g., a lower level layer such as a base layer and a higher level layer such as an enhancement layer). It should be understood that the examples described in this disclosure can be extended to examples with multiple base layers and/or enhancement layers as well.

As discussed above, each layer may include one or more blocks. Generally described, two blocks in different layers may be considered to be co-located if they occupy substantially corresponding spatial positions, but occur in different layers. For example, a base block in a base layer may be considered to be co-located with a non-causal block in the enhancement layer if the base block occupies a position in the base layer that is substantially similar to the position occupied by the non-causal block in the enhancement layer. It will be recognized that two co-located blocks may be the same size (for example, the base layer and the enhancement layer may have the same spatial resolution and/or partitioning mode), or may be different sizes (for example, the base layer and the enhancement layer may have different spatial resolutions or partitioning modes).

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1 is a block diagram that illustrates an example video coding system 10 that may utilize the techniques of this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), FTP servers, network attached storage (NAS) devices, and local disk drives. Destination device 14 may access the encoded video data through any standard data connection, including an Internet connection. Example types of data connections may include wireless channels (e.g., Wi-Fi, UMTS, LTE Advanced, or WiMAX channels, among other examples of wireless channels), wired connections (e.g., DSL, cable modem, or Ethernet, among other examples of wired connections), or combinations of both that are suitable for accessing encoded video data stored on a file server. The transmission of encoded video data from the file server may be a streaming transmission, a download transmission, or a combination of both.

The techniques of this disclosure may applied in many applications or settings, including wired environments, wireless environments, and environments that include both wired and wireless transmissions. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony. Still other applications or settings are possible for the techniques described herein.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, video data (e.g., a base layer and one or more enhancement layers corresponding to one or more frames of video data) can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory. Memory may also be referred to herein as a "memory unit."

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures.

To generate a coded picture, video encoder 20 may partition a picture into equally-sized video blocks. Each of the video blocks may be associated with a treeblock. In some instances, a treeblock may also be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

Generally described, a CU may refer to a rectangular image region that serves as a basic unit to which various coding tools are applied for video compression. To achieve better coding efficiency, a coding unit may have variable sizes depending on video content. To reduce redundancy, a CU is predicted and prediction residuals are signaled. A CU may split into smaller blocks for prediction (prediction units or PUs). According to HEVC or HM (i.e. the reference software for HEVC), a CU can have one of the two prediction modes: INTRA mode and INTER mode. A CU may also be split into smaller blocks for transform and each of these blocks is called a transform unit (TU).

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater. Still other sizes are possible.

Figure 2:
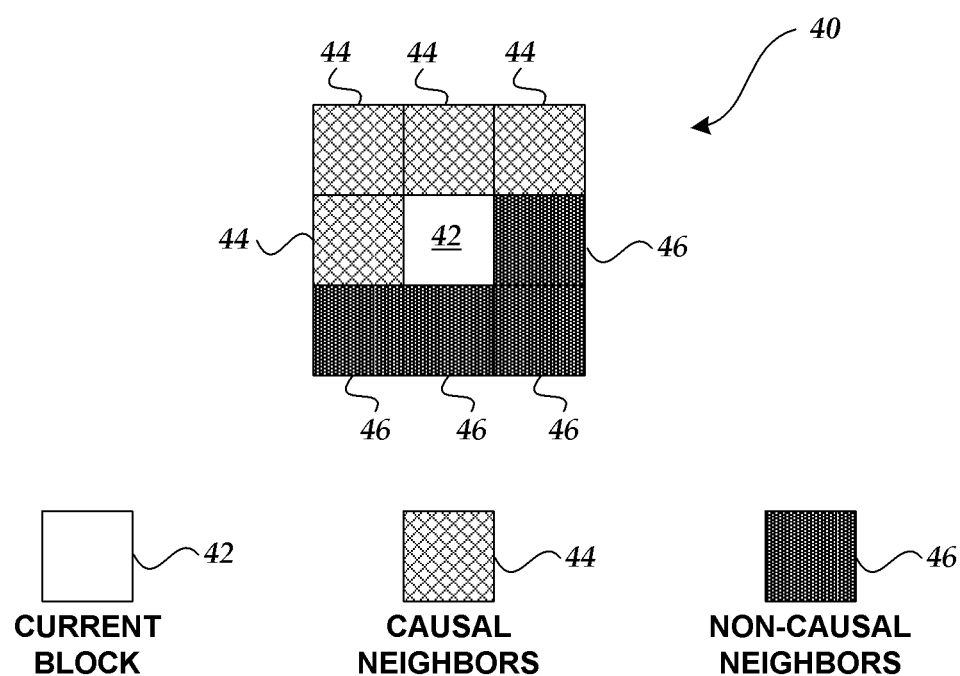
FIG. 2 is a conceptual diagram that illustrates example causal and non-causal blocks with respect to a current block.

With reference to FIG. 2, in several examples, CUs (e.g., CU 40) are processed sequentially in some fixed coding order within a layer. For example, the coding order may be line-by-line, left-to-right and top-to-bottom. Other coding orders are possible. Inside a CU, PUs and TUs are also processed sequentially in some fixed coding order. When processing the current block (i.e., a CU, PU, or TU) (e.g., block 42), blocks that have been previously processed (e.g., blocks that occur before the current block in the coding order, such as, for example blocks 44) are sometimes referred to herein as "causal" or "known" or "past" blocks. Blocks that have not yet been processed are sometimes referred to herein as "non-causal" or "unknown" or "future" blocks (e.g., blocks that occur after the current block in the coding order, such as, for example, blocks 46). As discussed above, in many examples, blocks to the top or left or bottom-left or top-right/left of the current block 42 may be causal, while blocks on bottom or right of the current block 42 may be non-causal. Again, it will be appreciated that the principles of the present disclosure are broadly applicable, regardless of the coding order in which blocks are processed.

When video encoder 20 encodes a non-partitioned CU, video encoder 20 may generate one or more prediction units (PUs) for the CU. A non-partitioned CU is a CU whose video block is not partitioned into video blocks for other CUs. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. When video encoder 20 uses inter prediction to generate the predicted video block of the PU, video encoder 20 may generate the predicted video block of the PU based on decoded values of pictures other than the picture associated with the PU. If video encoder 20 uses intra prediction to generate predicted video blocks of the PUs of a CU, the CU is an intra-predicted CU.

Figure 3:
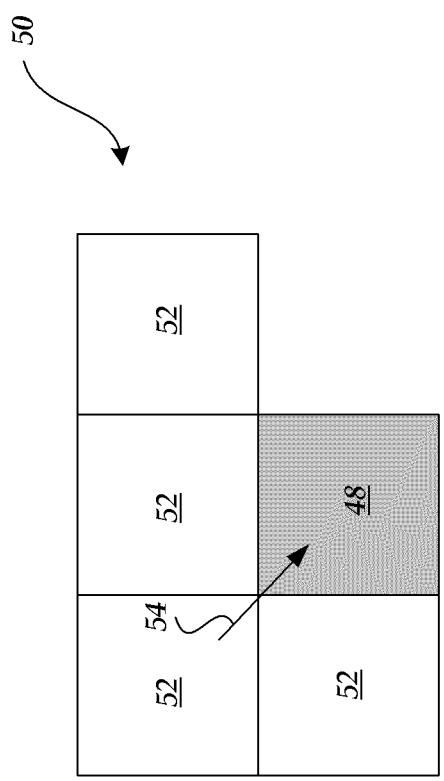
FIG. 3 is a conceptual diagram that illustrates reconstructed neighboring blocks to a current block and a current block determined using intra mode and an intra prediction direction of a reconstructed neighbor.

With reference to FIG. 3, a PU 48 in an INTRA CU (partially shown as CU 50) may be predicted spatially from already reconstructed neighboring pixels within an already reconstructed neighboring prediction unit 52 from the same frame or slice. Multiple intra prediction directions are allowed (although only one intra prediction direction 54 is shown in FIG. 3) and the best direction is signaled in the bitstream. Different PUs 52 in an INTRA CU 50 may have different prediction directions 54. Prediction directions may be indicated by corresponding prediction modes.

When video encoder 20 uses intra prediction on a PU, video encoder 20 may generate a list of candidate intra prediction modes. The list of candidate intra prediction modes may be based on the intra prediction modes of PUs that spatially or temporally neighbor the PU. In addition, as described below, the list of candidate intra prediction modes may include an intra prediction mode from a base layer. Video encoder 20 may select one of the candidate modes from the list and generate an index that indicates a location of the selected candidate mode in the list. Video encoder 20 may signal the intra prediction mode of the PU by outputting the index. In some instances, video encoder 20 may signal the intra prediction mode of the PU by outputting the index of the selected candidate mode and outputting a difference between the intra prediction mode of the selected candidate mode and the intra prediction mode of the PU.

Intra prediction may be performed using either pixel domain or difference domain. Intra prediction is based on neighboring pixels and the intra prediction mode. Some examples of intra prediction modes include vertical mode, horizontal mode, DC mode, planar mode, angular mode. Additional intra prediction modes may also be available. For example, in HEVC, 18 intra prediction modes are available for 4×4 blocks and 36 intra prediction modes are available for 8×8 blocks. In DC mode, the neighboring pixel values may be used in intra prediction for the current pixel.

Figure 4:
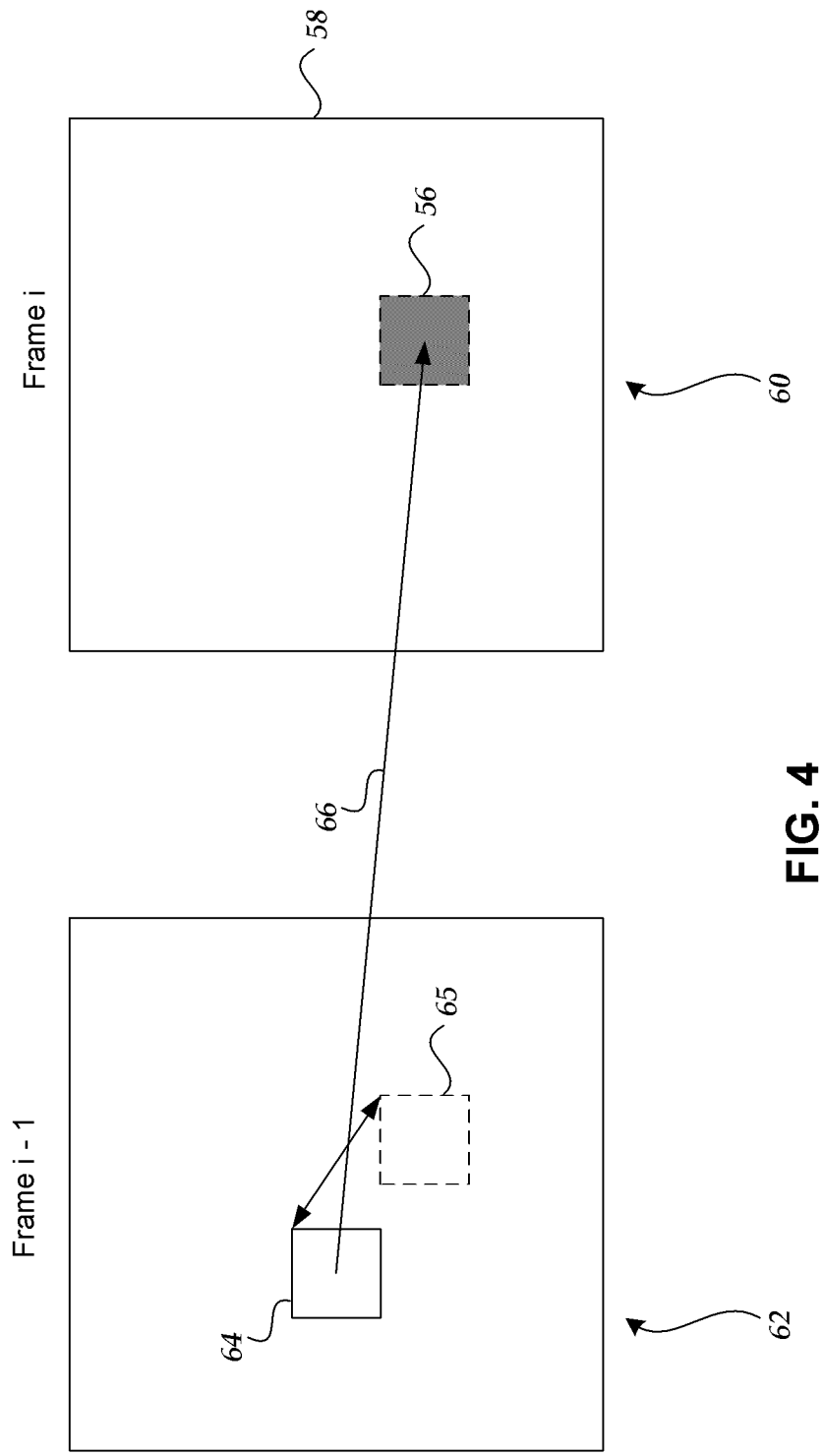
FIG. 4 is a conceptual diagram that illustrates a current block determined using an inter mode.

Turning to FIG. 4, when video encoder 20 uses inter prediction to generate a predicted video block for a PU, video encoder 20 may generate motion information for the PU. The motion information for a PU may indicate a portion of another picture that corresponds to the video block of the PU. In other words, the motion information for a PU may indicate a "reference sample" for the PU. Video encoder 20 may generate the predicted video block for the PU based on the portions of the other pictures that are indicated by the motion information for the PU. If video encoder 20 uses inter prediction to generate predicted video blocks for the PUs of a CU, the CU is an inter-predicted CU.

With continued reference to FIG. 4, a PU 56 in an INTER CU 58 in a frame 60 may be predicted temporally from best matched block or weighted blocks in already decoded previous frame 62 or frames (in decoded order). Such blocks may be called reference blocks 64. The reference block 64 (or blocks) may be co-located with the PU 56 or may be spatially separated from a co-located block 65 in the previous frame 62. The motion info 66 which identifies the reference block 64 or blocks may be signaled in the bitstream. Different PUs in an INTER CU may have different motion info.

The emerging HEVC Working Draft (WD) may be considered in view of the above discussion of H.264/AVC. In the HEVC WD, there are two modes for the prediction of motion parameters. One mode may be referred to as a "merge mode," while the other mode may be referred to as an "advanced motion vector prediction" mode or "AMVP" mode.

Merge mode is a video coding mode in which motion information (such as motion vectors, reference frame indexes, prediction directions, or other information) of a neighboring video block are inherited for a current video block being coded. An index value may be used to identify a neighboring block from which the current video block may inherit its motion information (e.g., top, top right, left, left bottom or collocated from a temporally adjacent frame).

Another case where the motion vector of a neighboring video block is used in the coding of a current video block is motion vector prediction. In this case, predictive coding of motion vectors may be applied to reduce the amount of data used to communicate the motion vector. For example, rather than encoding and communicating the motion vector itself, the encoder may encode and communicate a motion vector difference (MVD) relative to a known (or knowable) motion vector. Advanced motion vector prediction (AMVP) allows for many possible candidates for defining the MVD.

Both merge mode and AMVP mode build a candidate list for reference picture list zero or "RefPicList0" and a candidate list for reference picture list one or "RefPicList1." Each of these reference picture lists may be used for unidirectional or bidirectional prediction. The reference picture lists may further specify a list of potential pictures or frames to be used to perform temporal and/or spatial motion prediction. In AMVP mode the information used to code motion parameters of a current block may be obtained from spatially and/or temporally neighboring blocks. The reference index values may be signaled as well.

In merge mode, on the other hand, reference index values may not be signaled, since the current prediction unit (PU) shares the reference index values of the chosen candidate motion vector predictor. In some instances, merge mode may be implemented such that only one candidate list is created.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (i.e., residual video blocks) associated with transform units (TUs) of the CU. Each TU of a CU may be associated with a different residual video block. Video coder 20 may perform transform operations on each TU of the CU.

When video encoder 20 performs the transform operation on a TU, video encoder 20 may apply one or more transforms to a residual video block associated with the TU to generate one or more transform coefficient blocks (i.e., blocks of transform coefficients) associated with the TU. Conceptually, a transform coefficient block may be a two-dimensional (2D) matrix of transform coefficients.

After generating a transform coefficient block, video encoder 20 may perform a quantization operation on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may scan the quantized transform coefficients to produce a one-dimensional vector of transform coefficient levels. Video encoder 20 may entropy encode the one-dimensional vector. Video encoder 20 may also entropy encode other syntax elements associated with the video data.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include entropy encoded syntax structures, such as entropy-encoded transform coefficient blocks, motion information, and so on.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may determine the video blocks of CUs based on the syntax elements in the bitstream.

Figure 5:
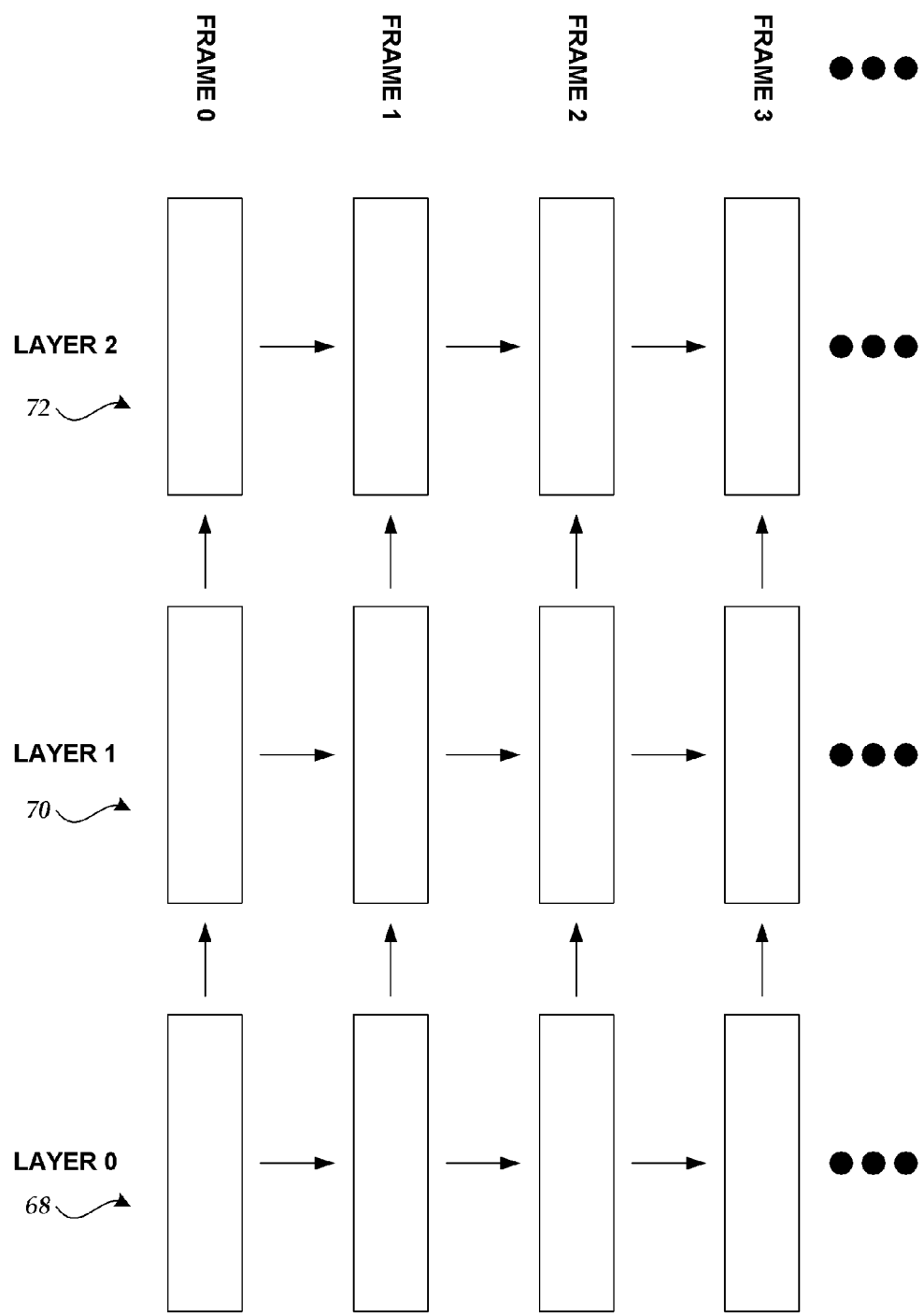
FIG. 5 is a conceptual diagram that illustrates information for a three-layer scalable video codec.

FIG. 5 shows an example setup for a 3-layer scalable video codec. The video encoder 20 and video decoder 30 may use scalable video coding (SVC). In SVC, there is one absolute base layer (layer 0) 68 and one or more enhancement layers (layer 1, 2, 3 . . . ) 70, 72. Each enhancement layer 70, 72 may serve as a base layer for other layers above it (e.g., enhancement layers having a higher number). For example, layer 1 70 may be an enhancement layer relative to layer 0 68, but layer 1 70 may also serve as a base layer for layer 2 72. Relative to its base layer, each enhancement layer may provide better quality and/or spatial or temporal resolution. Correspondingly, the scalability is called quality (or SNR) scalability, spatial scalability and temporal scalability.

Figure 6:
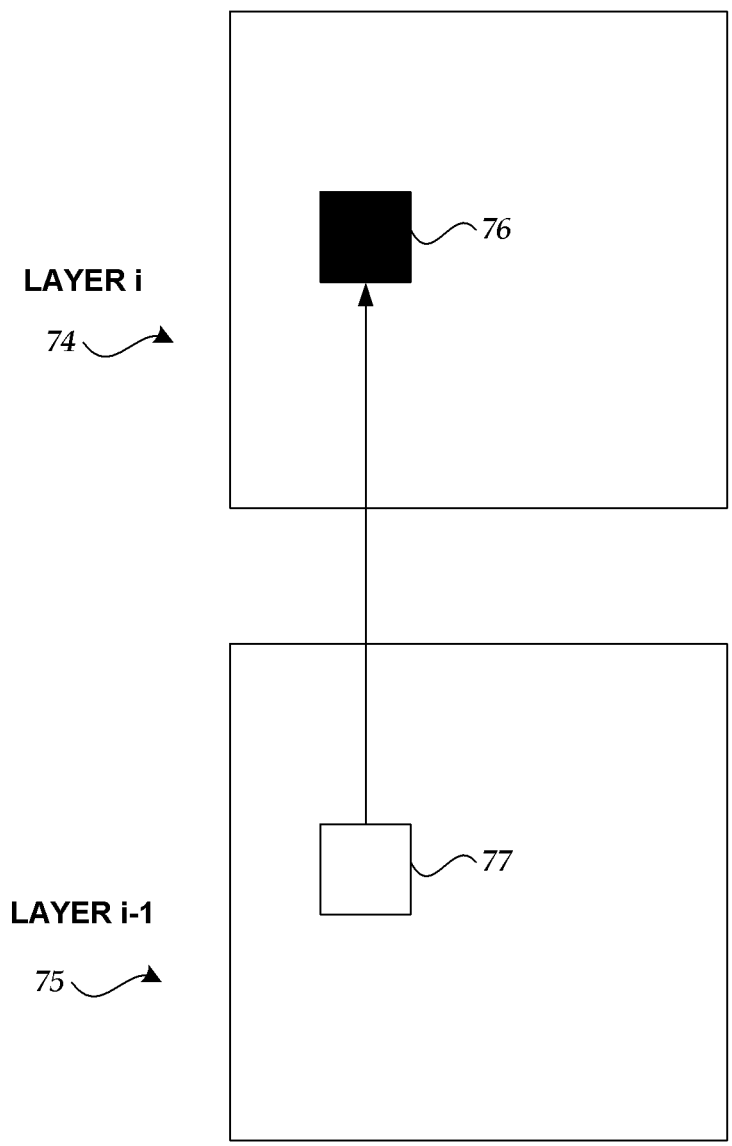
FIG. 6 is a conceptual diagram that illustrates a current block determined using an INTRA_BL mode.

Turning now to FIG. 6, when video decoder 30 decodes a layer I 74, one or more lower layers (0, . . . , i–1) 75 may have already been decoded. Thus, at least some information from those lower layers 75 may be available for use in coding layer I 74. For example, for an enhancement layer block 76, besides regular INTRA and INTER modes described above, there is another prediction mode: INTRA_BL mode. In INTRA_BL mode, a block 76 is predicted from a reconstructed co-located block 77 of its base layer 75 as shown in FIG. 6. For instance, if video encoder 20 encodes a block 76 using the INTRA_BL mode, video decoder 30 may adopt the intra prediction mode of a co-located base layer block 77 as the intra prediction mode of the block 76. In other words, if the block 76 is encoded in INTRA_BL mode, video decoder 30 may predict the intra prediction mode of the block 76 based on the intra prediction mode of the co-located base layer block 77.

With continued reference to FIG. 6, if lower layers 75 are decoded before decoding the current layer 74, the coded units or blocks at lower layers may be considered to be causal to the blocks of the current layer, regardless of their locations inside the frame or slice. In low-delay applications in which a base layer frame or slice may not necessarily be fully decoded before decoding a block 76 at the current layer 74, it is also possible that blocks of the base layer 75 that are co-located with non-causal neighbors of the current block 76 in the enhancement layer have been decoded already, and thus may be causal to the current block 76.

Prediction information (e.g. intra prediction direction and motion info) may be highly correlated spatially. To improve the coding efficiency of such prediction information, such prediction information may be predicted using the same prediction information from neighboring PUs. Accordingly, the video encoder 20 may only signal prediction difference to video decoder 30. If a neighbor PU has a different mode than a current PU (e.g., one is intra mode and another is inter mode), then the prediction information of the neighbor PU may not be used to determine the prediction info of the current PU, which may reduce coding efficiency.

In SVC, when a neighbor PU has a certain prediction mode, how the PU's prediction information is set may affect coding performance of succeeding blocks, because the prediction information may be used in predicting the prediction information of those succeeding blocks.

In SVC, prediction information used in a lower layer block may serve as a good estimate of the prediction mode that should be used for the corresponding block in a layer currently being coded (i.e., the current layer). So, if some prediction information is not available for a block in the current layer, a video coder can propagate the same prediction information (such as intra prediction direction and motion information) from the co-located block in the base layer if available and use the prediction information as if the prediction information were the prediction information for the block in the current layer. The video coder may use the propagated prediction information in the current layer to predict the prediction information of succeeding blocks in the current layer. This may help improving coding efficiency.

Figure 7:
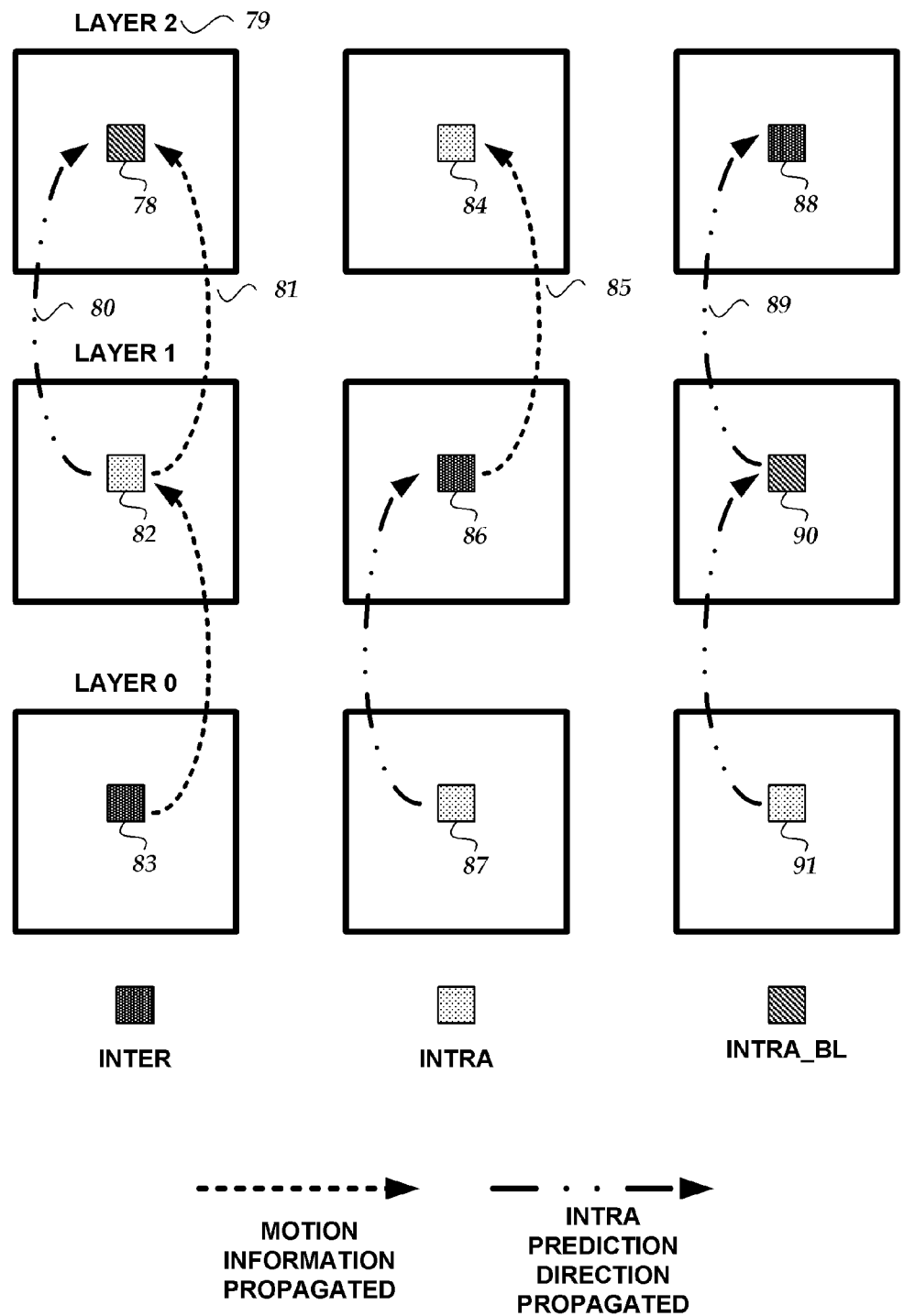
FIG. 7 is a conceptual diagram that illustrates example propagation of prediction information across layers.

FIG. 7 is a conceptual diagram that illustrates an example embodiment of propagation of prediction information across layers. For example, a video coder (e.g., video encoder 20 or video decoder 30) may determine that an enhancement layer neighbor block does not have a same prediction mode as a current block. In this example, the enhancement layer neighbor block and the current block may be in an enhancement layer. In addition, the video coder may determine that a base layer neighbor block has the same prediction mode as the current block. In this example, the base layer neighbor block is in a base layer and is co-located with the enhancement layer neighbor block. Under traditional implementations, when the enhancement layer neighbor block and the current block do not have the same prediction mode, a traditional system skips over using prediction information from the enhancement layer neighbor block to determine prediction information for the current block. However, in the embodiment of FIG. 7, in response to determining that the enhancement layer neighbor block does not have the same prediction mode as the current block and that the base layer neighbor block has the same prediction mode as the current block, the video coder may determine prediction information of the current block using prediction information of the base layer neighbor block. In some instances, the prediction information of the base layer neighbor block is an intra prediction mode and the prediction information of the current block is also an intra prediction mode. In other instances, the prediction information of the base layer neighbor block and the prediction information of the current block is motion information.

In the example of the previous paragraph, the video coder may predict the prediction information of the current block by including the prediction information of the base layer neighbor block as a candidate in a candidate list for the current block. In examples where the video coder encodes video data, predicting the prediction information of the current block may comprise selecting a given candidate from among candidates in the candidate list. In such examples, the video encoder may output an index of the selected candidate. In examples where the video coder decodes video data, the video decoder may receive an index of a given candidate in the candidate list. In such examples, predicting the prediction information of the current block may comprise using the prediction information of the given candidate as the prediction information of the current block.

In accordance with the techniques of this disclosure, there are at least three cases in which an enhancement layer block may borrow prediction information from a co-located block in a base layer so that such borrowed prediction information can be used in coding succeeding blocks at the current enhancement layer.

In a first case, a given block 78 is coded in INTRA_BL mode and therefore does not have native intra prediction direction or motion information. (FIG. 7, top left). In this first case, for each 4×4 sub-part of the given block 78 in the current layer 79, intra prediction direction 80 and motion information 81 is copied from the co-located sub-part 82 of its base layer. Since sub-part 82 is intra coded it does not have native motion information either. Motion information of sub-part 82 is therefore copied from the co-located sub-part 83 of its base layer, which is inter coded. The propagation of intra prediction direction and motion information in the foregoing manner may benefit prediction of succeeding blocks if the succeeding blocks are coded in intra or inter mode. The succeeding blocks may be blocks in the current layer that occur after the given block according to a coding order.

For example, the prediction mode of an enhancement layer neighbor block may be INTRA_BL and the prediction mode of a current block may be inter mode or intra mode. In this example, the prediction information of a base layer neighbor block is an intra prediction mode or motion information. In this example, a video coder may determine prediction information of the current block using prediction information of the base layer neighbor block.

In a second case, a given block 84 is coded in intra mode so it does not have native motion information (FIG. 7, top center). In this second case, for each 4×4 sub-part, motion information 85 is copied from the co-located sub-part 86 of its base layer, which is inter coded. Note in this case that although intra prediction direction is propagated from sub-part 87 to sub-part 86, it is not propagated to sub-part 84 because sub-part 84 has native intra prediction information that is more accurate. The propagation of motion information in the foregoing manner may benefit prediction of succeeding blocks if the succeeding blocks are coded in inter mode. The succeeding blocks may be blocks in the current layer that occur after the given block according to a coding order. For example, the prediction mode of an enhancement layer neighbor block may be intra mode and the prediction mode of a current block may be inter mode. In this example, a video coder may determine prediction information of the current block using prediction information of the base layer neighbor block.

In a third case, a current block 88 is coded in inter mode. (FIG. 7, top right). In this third case, for each 4×4 sub-part, intra prediction direction 89 may be copied from the co-located sub-part 90 of its base layer, if available. Since sub-part 90 is coded as INTRA_BL, it does not have native intra prediction information, so intra prediction information is copied from co-located sub-part 91 of its base layer. The propagation of intra prediction information in the foregoing manner may benefit prediction of succeeding blocks if the succeeding blocks are coded in intra mode. The succeeding blocks may be blocks in the current layer that occur after the given block according to a coding order. For example, the prediction mode of the enhancement layer neighbor block may be inter mode and the prediction mode of the current block may be intra mode. In this example, a video coder may determine prediction information of the current block using prediction information of the base layer neighbor block.

Furthermore, in accordance with the techniques of this disclosure, the following may be performed while propagating prediction information across layers:

First, in case the base layer and the enhancement layer do not have the same spatial resolution (e.g., spatial scalability scenario), a video coder may need to process prediction information accordingly. For example, a video coder may need to scale motion vectors may in this case based on spatial scaling ratio between the two layers.

In this way, an enhancement layer and a base layer may have different spatial resolutions and the prediction information of a base layer neighbor block may comprise a motion vector. A video coder may determine the prediction information of a current block at least in part by scaling the motion vector.

Second, information from a co-located block in the base layer may be propagated directly to the current layer if the reference picture of the co-located block in base layer is also in the current layer reference picture list. Otherwise, proper mapping may be needed. For example, a video coder may scale motion vectors accordingly based on the picture order count (POC) distance of the reference picture in base layer block relative to the current picture and the POC distance of the reference picture in the current enhancement layer relative to the current picture.

For example, the prediction information of a base layer neighbor block may comprise a motion vector and a reference picture index that indicates a reference picture in a base layer reference picture list. In this example, the base layer reference picture list may be a reference picture list associated with the base layer neighbor block. Furthermore, in this example, an enhancement layer reference picture list is different than the base layer reference picture list. The enhancement layer reference picture list is a reference picture list associated with the enhancement layer neighbor block. In this example, a video coder may determine the prediction information of the current block at least in part by scaling the motion vector based on a picture order count (POC) distance of the reference picture relative to a current picture and a POC distance of a reference picture in the enhancement layer reference picture list relative to the current picture.

Prediction information propagated from base layer may be assigned a lower weight than prediction information obtained from the current layer in forming a predictor for coding the prediction information of a given block. For example, determining the prediction information of a current block may comprise assigning a lower weight to the prediction information of a base layer neighbor block relative to prediction information of a block in an enhancement layer.

Figure 8:
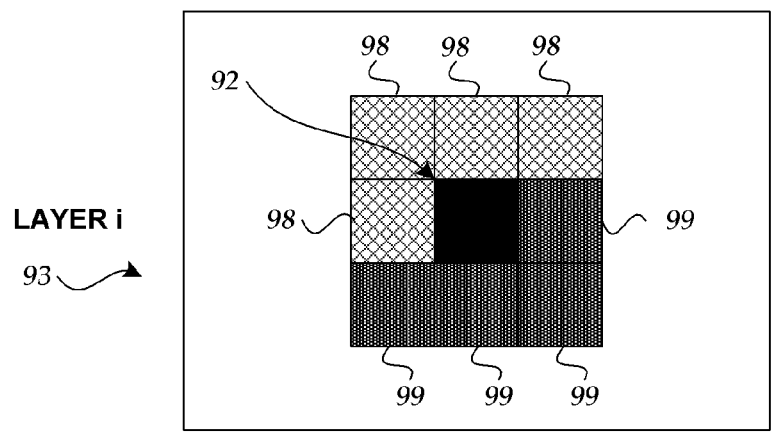
FIG. 8 is a conceptual diagram that illustrates possible predictors for a current block of an enhancement layer.
Figure 8:
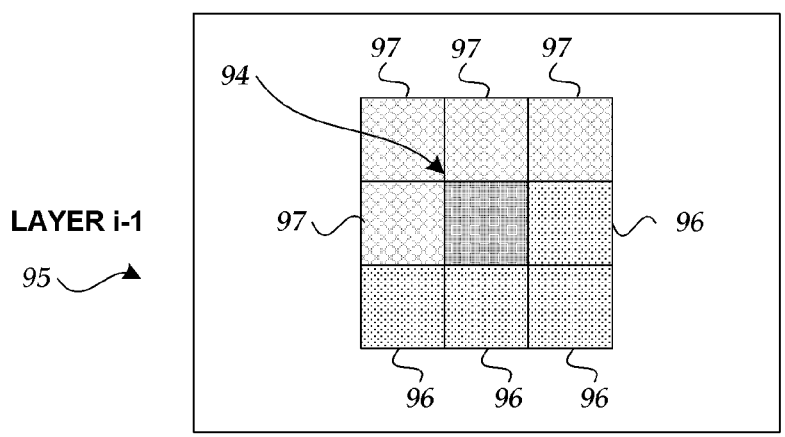

Turning to FIG. 8, Case A, in some current approaches to SVC, for a current block 92 in an enhancement layer 93, usually only the current block's co-located block 94 at base layer 95 is used in predicting the information of the current block 92. Non-causal blocks 96 for the co-located block 94 that lie in the base layer 95 are not used for coding the current block 92 in the enhancement layer 93. One drawback of this approach is that the relatively limited amount of information used for determining prediction information may hinder coding efficiency.

As shown in FIG. 8, Case B, to improve coding efficiency, it may be desirable to use more available information to determine predictors and/or contexts. Advantageously, the current block 92 may be predicted and/or coded with improved efficiency. The techniques described herein may enable using information from co-located blocks 97 at a base layer 95 of those causal neighbor blocks 98 at current enhancement layer 93 as predictors if they have more information than the causal neighbor blocks 98 at the current layer 93.

As shown in FIG. 8, Case C, since neighboring non-causal blocks 99 of the current layer 93 to the current block 92 have not yet been processed, information from their co-located blocks 96 in the base layer 95 (which have been previously coded) may be used to provide information in predicting and coding the current block 92. Advantageously, coding efficiency for the current block 92 in the current layer 93 may be improved with this additional information.

A co-located block in a base layer may not always come from an immediate base layer. Rather, a co-located block may also come from other base layers (not shown). For example, if the current block's 92 motion field is to be predicted but the co-located block of the immediate base layer is intra coded (and thus lacks motion information), then a layer at an even lower level may be checked and its motion field information may be used, if available.

For example, a video coder may generate base layer information by coding a base block, the base block being in a base layer 95. In addition, the video coder may determine, based on the base layer information, prediction information of a current block 92 in an enhancement layer 93 that includes a plurality of blocks 98, 99, including a non-causal block 99. In this example, the current block 92 may be in an enhancement layer 93, the base layer block 96 may be co-located with the non-causal enhancement layer block 99, and the non-causal enhancement layer block 99 may occur in the enhancement layer 93 after the current block 92 according to a coding order of the enhancement layer 93.

In accordance with the techniques of the present disclosure, for intra prediction, if a co-located block 96 at the base layer 95 for a non-causal block 99 at the current layer 93 can be fully reconstructed at the base layer 95 (multi-loop approach or intra coded for single-loop approach), then its reconstructed pixel values can be used as predictors to do intra prediction for the current block 92 at the current layer 93. For instance, determining the prediction information of a current block 92 may comprise generating predicted pixel values of the current block 92 based on predicted pixel values of a base layer block.

For intra prediction angle prediction, if the current block 92 is coded in intra mode, intra prediction information of co-located blocks 96 at the base layer 95 for non-causal blocks 99 at the current layer 93 is used to determine the intra prediction info of the current block 92 at the current layer 93. Such intra prediction info may include at least the prediction angle. For instance, determining the prediction information of a current block 92 may comprise adopting the intra prediction direction of the base layer block as an intra prediction direction of the current block 92.

Similarly, for motion field prediction, motion field information of co-located blocks 96 at the base layer 95 for non-causal blocks 99 at the current layer 93 is used as a predictor candidate in the candidate list for coding motion field info of a current block 92 at the current layer 93. For instance, determining the prediction information of a current block 92 may comprise adopting the motion information of a base layer block as motion information of the current block 92.

A similar concept can also be applied to coding contexts to code CU/PU/TU modes/partitions etc. For example, a video coder may generate base layer information by coding a base layer block, the base layer block being in a base layer 95. In addition, the video coder may select, based on the base layer information, a context for entropy coding information of a current block 92. In this example, the current block 92 may be in an enhancement layer 93, the base layer block 96 may be co-located with a non-causal current layer block 99, and the non-causal current layer block 99 may occur in the enhancement layer after the current block 92 according to a coding order. In this example, the video coder may use the selected context to entropy code the information of the current block 92. Entropy coding the information may comprise entropy encoding or entropy decoding the information of the current block 92.

Furthermore, in the example of the previous paragraph, the base layer information may comprise an intra prediction direction of the base layer block. Alternatively, the base layer information may comprise motion information of the base layer block. In another alternative, the base layer information may comprise a partitioning mode of the base layer block.

A co-located block may not be a real block at a lower layer. This could happen if the two layers have different spatial resolutions, and/or different CU/PU/TU partitioning modes. In these cases, the co-located block is a derived one whose information is derived from a number of blocks at the lower layer, based on a spatial scaling ratio and/or related other factors.

In many of the examples discussed herein, the non-causal block of the enhancement layer is co-located with a base block of a base layer and is a neighbor to the current block of the enhancement layer. However, the non-causal block of the enhancement layer need not be immediately spatially adjacent to the current block of the enhancement layer. Rather, the non-causal block may be any block in the enhancement layer that occurs after the current block in the coding order of the enhancement layer.

Figure 9:
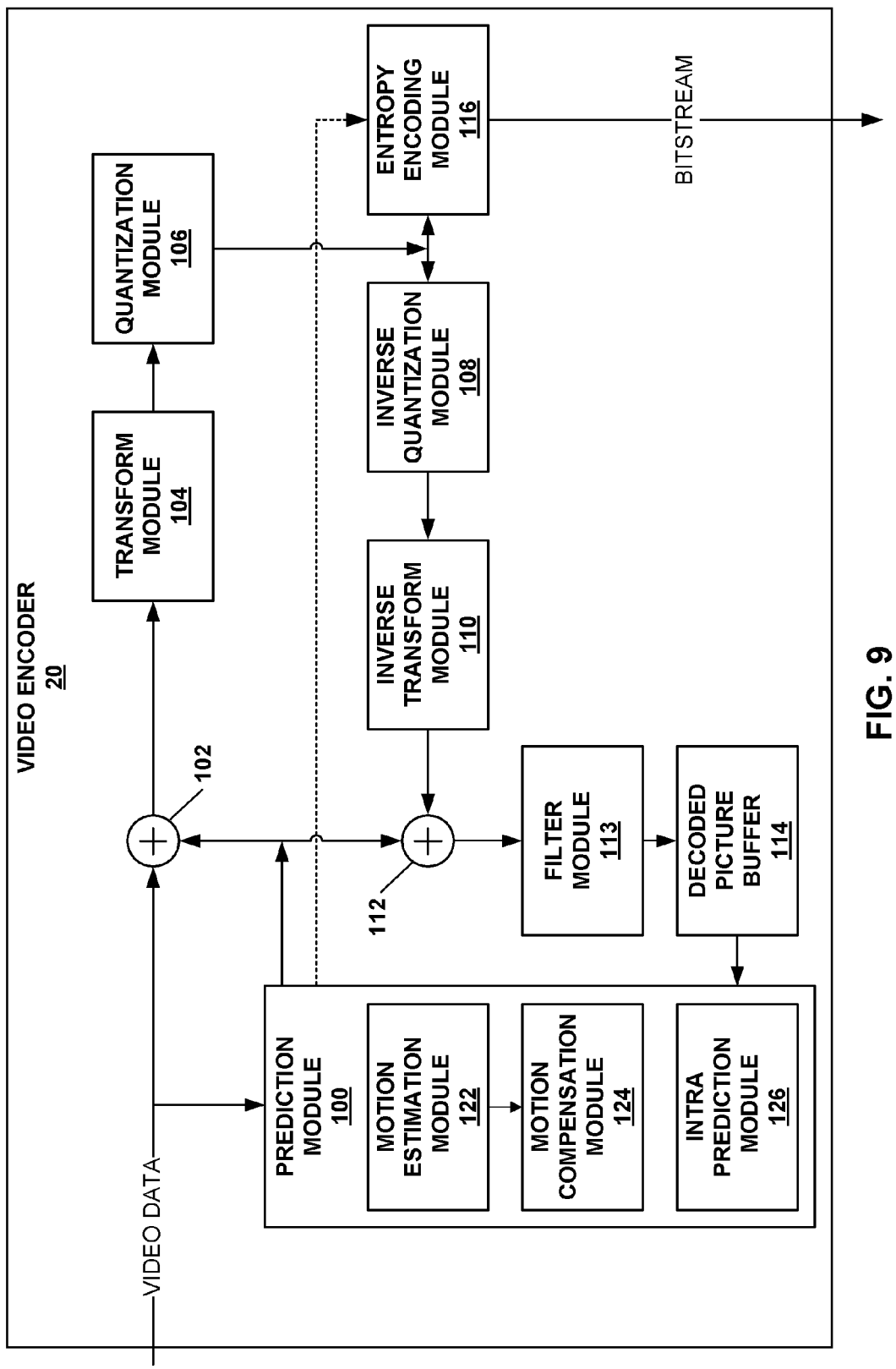
FIG. 9 is a block diagram illustrating an example video encoder that may implement the techniques of this disclosure.

FIG. 9 is a block diagram that illustrates an example video encoder 20 that is configured to implement the techniques of this disclosure. FIG. 9 is provided for purposes of explanation and should not be considered limiting of the techniques as broadly illustrated and described in this disclosure. For purposes of explanation, this disclosure describes video encoder 20 in the context of HEVC coding. However, the techniques of this disclosure may be applicable to other coding standards or methods.

In the example of FIG. 9, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, a filter module 113, a decoded picture buffer 114, and an entropy encoding module 116. Prediction module 100 includes a motion estimation module 122, a motion compensation module 124, and an intra prediction module 126. In other examples, video encoder 20 may include more, fewer, or different functional components. Furthermore, motion estimation module 122 and motion compensation module 124 may be highly integrated, but are represented in the example of FIG. 9 separately for purposes of explanation.

Video encoder 20 may receive video data. Video encoder 20 may receive the video data from various sources. For example, video encoder 20 may receive the video data from video source 18 as discussed above with respect to FIG. 1, or from another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction module 100 may perform quadtree partitioning on the video block of the treeblock to divide the video block into progressively smaller video blocks. Each of the smaller video blocks may be associated with a different CU. For example, prediction module 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction module 100 may generate a hierarchical quadtree data structure for the treeblock. For example, a treeblock may correspond to a root node of the quadtree data structure. If prediction module 100 partitions the video block of the treeblock into four sub-blocks, the root node has four child nodes in the quadtree data structure. Each of the child nodes corresponds to a CU associated with one of the sub-blocks. If prediction module 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction module 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction module 100 may perform geometric partitioning to partition the video block of a CU among PUs of the CU along a boundary that does not meet the sides of the video block of the CU at right angles.

Motion estimation module 122 and motion compensation module 124 may perform inter prediction on each PU of the CU. Inter prediction may provide temporal compression. To perform inter prediction on a PU, motion estimation module 122 may generate motion information for the PU. Motion compensation module 124 may generate a predicted video block for the PU based the motion information and decoded samples of pictures other than the picture associated with the CU (i.e., reference pictures). In this disclosure, a predicted video block generated by motion compensation module 124 may be referred to as an inter-predicted video block.

Slices may be I slices, P slices, or B slices. Motion estimation module 122 and motion compensation module 124 may perform different operations for a PU of a CU depending on whether the PU is in an I slice, a P slice, or a B slice. In an I slice, all PUs are intra predicted. Hence, if the PU is in an I slice, motion estimation module 122 and motion compensation module 124 do not perform inter prediction on the PU.

If the PU is in a P slice, the picture containing the PU is associated with a list of reference pictures referred to as "list 0." Each of the reference pictures in list 0 contains samples that may be used for inter prediction of subsequent pictures in decoding order. When motion estimation module 122 performs the motion estimation operation with regard to a PU in a P slice, motion estimation module 122 may search the reference pictures in list 0 for a reference sample for the PU. The reference sample of the PU may be a set of samples, e.g., a block of samples that most closely corresponds to the samples in the video block of the PU. Motion estimation module 122 may use a variety of metrics to determine how closely a set of samples in a reference picture corresponds to the samples in the video block of a PU. For example, motion estimation module 122 may determine how closely a set of samples in a reference picture corresponds to the samples in the video block of a PU by sum of absolute difference (SAD), sum of square difference (SSD), or other difference metrics.

After identifying a reference sample of a PU in a P slice, motion estimation module 122 may generate a reference index that indicates the reference picture in list 0 containing the reference sample and a motion vector that indicates a spatial displacement between the PU and the reference sample. In various examples, motion estimation module 122 may generate motion vectors to varying degrees of precision. For example, motion estimation module 122 may generate motion vectors at one-quarter sample precision, one-eighth sample precision, or other fractional sample precision. In the case of fractional sample precision, reference sample values may be interpolated from integer-position sample values in the reference picture. Motion estimation module 122 may output the reference index and the motion vector as the motion information of the PU. Motion compensation module 124 may generate a predicted video block of the PU based on the reference sample identified by the motion information of the PU.

If the PU is in a B slice, the picture containing the PU may be associated with two lists of reference pictures, referred to as "list 0" and "list 1." Each of the reference pictures in list 0 contains samples that may be used for inter prediction of subsequent pictures in decoding order. The reference pictures in list 1 occur before the picture in decoding order but after the picture in presentation order. In some examples, a picture containing a B slice may be associated with a list combination that is a combination of list 0 and list 1.

Furthermore, if the PU is in a B slice, motion estimation module 122 may perform uni-directional prediction or bi-directional prediction for the PU. When motion estimation module 122 performs uni-directional prediction for the PU, motion estimation module 122 may search the reference pictures of list 0 or list 1 for a reference sample for the PU. Motion estimation module 122 may then generate a reference index that indicates the reference picture in list 0 or list 1 that contains the reference sample and a motion vector that indicates a spatial displacement between the PU and the reference sample. Motion estimation module 122 may output the reference index, a prediction direction indicator, and the motion vector as the motion information of the PU. The prediction direction indicator may indicate whether the reference index indicates a reference picture in list 0 or list 1. Motion compensation module 124 may generate the predicted video block of the PU based on the reference sample indicated by the motion information of the PU.

When motion estimation module 122 performs bi-directional prediction for a PU, motion estimation module 122 may search the reference pictures in list 0 for a reference sample for the PU and may also search the reference pictures in list 1 for another reference sample for the PU. Motion estimation module 122 may then generate reference indexes that indicate the reference pictures in list 0 and list 1 containing the reference samples and motion vectors that indicate spatial displacements between the reference samples and the PU. Motion estimation module 122 may output the reference indexes and the motion vectors of the PU as the motion information of the PU. Motion compensation module 124 may generate the predicted video block of the PU based on the reference samples indicated by the motion information of the PU.

In some instances, motion estimation module 122 does not output a full set of motion information for a PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a quadtree node for a CU associated with the PU, a value that indicates to video decoder 30 that the PU has the same motion information as the neighboring PU. In another example, motion estimation module 122 may identify, in a quadtree node associated with the CU associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to predict the motion vector of the PU. By referring to the motion information of a first PU when signaling the motion information of a second PU, video encoder 20 may be able to signal the motion information of the second PU using fewer bits.

As part of performing an encoding operation on a CU, intra prediction module 126 may perform intra prediction on PUs of the CU. Intra prediction may provide spatial compression. When intra prediction module 126 performs intra prediction on a PU, intra prediction module 126 may generate prediction data for the PU based on decoded samples of other PUs in the same picture. The prediction data for the PU may include a predicted video block and various syntax elements. Intra prediction module 126 may perform intra prediction on PUs in I slices, P slices, and B slices.

To perform intra prediction on a PU, intra prediction module 126 may use multiple intra prediction modes to generate multiple sets of prediction data for the PU. When intra prediction module 126 uses an intra prediction mode to generate a set of prediction data for the PU, intra prediction module 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction module 126 may use various numbers of intra prediction modes, e.g., 33 directional intra prediction modes, depending on the size of the PU.

Prediction module 100 may select the prediction data for a PU from among the prediction data generated by motion compensation module 124 for the PU or the prediction data generated by intra prediction module 126 for the PU. In some examples, prediction module 100 selects the prediction data for the PU based on rate/distortion metrics of the sets of prediction data.

If prediction module 100 selects prediction data generated by intra prediction module 126, prediction module 100 may signal the intra prediction mode that was used to generate the prediction data for the PUs, i.e., the selected intra prediction mode. Prediction module 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction module 100 may generate a syntax element to indicate that the selected intra prediction mode is the same as the intra prediction mode of the neighboring PU.

After prediction module 100 selects the prediction data for PUs of a CU, residual generation module 102 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction module 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. Non-partitioned TUs of a CU may correspond to leaf nodes of the RQT.

A TU may have one or more sub-TUs if the residual video block associated with the TU is partitioned into multiple smaller residual video blocks. Each of the smaller residual video blocks may be associated with a different one of the sub-TUs.

Transform module 104 may generate one or more transform coefficient blocks for each non-partitioned TU of a CU by applying one or more transforms to a residual video block associated with the TU. Each of the transform coefficient blocks may be a 2D matrix of transform coefficients. Transform module 104 may apply various transforms to the residual video block associated with a TU. For example, transform module 104 may apply a discrete cosine transform (DCT), a directional transform, or a conceptually similar transform to the residual video block associated with a TU.

After transform module 104 generates a transform coefficient block associated with a TU, quantization module 106 may quantize the transform coefficients in the transform coefficient block. Quantization module 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization module 108 and inverse transform module 110 may apply inverse quantization and inverse transforms to the transform coefficient block, respectively, to reconstruct a residual video block from the transform coefficient block. Reconstruction module 112 may add the reconstructed residual video block to corresponding samples from one or more predicted video blocks generated by prediction module 100 to produce a reconstructed video block associated with a TU. By reconstructing video blocks for each TU of a CU in this way, video encoder 20 may reconstruct the video block of the CU.

After reconstruction module 112 reconstructs the video block of a CU, filter module 113 may perform a deblocking operation to reduce blocking artifacts in the video block associated with the CU. After performing the one or more deblocking operations, filter module 113 may store the reconstructed video block of the CU in decoded picture buffer 114. Motion estimation module 122 and motion compensation module 124 may use a reference picture that contains the reconstructed video block to perform inter prediction on PUs of subsequent pictures. In addition, intra prediction module 126 may use reconstructed video blocks in decoded picture buffer 114 to perform intra prediction on other PUs in the same picture as the CU.

In this way, after filter module 113 applies a deblocking filter to the samples associated with an edge, prediction module 100 may generate a predicted video block based at least in part on the samples associated with the edge. Video encoder 20 may output a bitstream that includes one or more syntax elements whose values are based at least in part on the predicted video block.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives the data, entropy encoding module 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 116 may output a bitstream that includes the entropy encoded data.

As part of performing an entropy encoding operation on data, entropy encoding module 116 may select a context model. If entropy encoding module 116 is performing a CABAC operation, the context model may indicate estimates of probabilities of particular bins having particular values. In the context of CABAC, the term "bin" is used to refer to a bit of a binarized version of a syntax element.

If the entropy encoding module 116 is performing a CAVLC operation, the context model may map coefficients to corresponding codewords. Codewords in CAVLC may be constructed such that relatively short codes correspond to more probable symbols, while relatively long codes correspond to less probable symbols. Selection of an appropriate context model may advantageously improve the coding efficiency of the entropy encoding operation.

Figure 10:
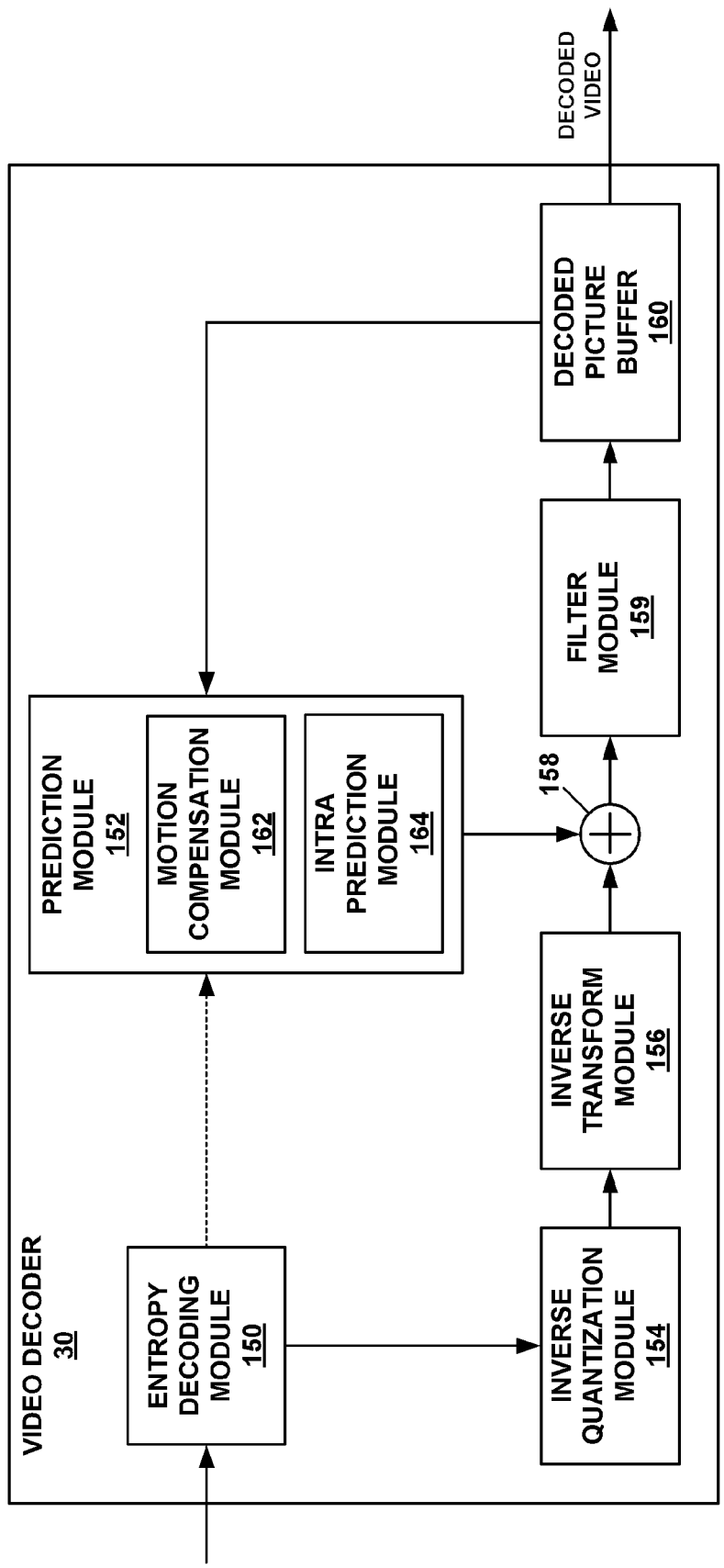
FIG. 10 is a block diagram illustrating an example video decoder that may implement the techniques of this disclosure.

FIG. 10 is a block diagram that illustrates an example video decoder 30 that may implement the techniques of this disclosure. FIG. 10 is provided for purposes of explanation and is not limiting on the techniques as broadly illustrated and described in this disclosure. For purposes of explanation, this disclosure describes video decoder 30 in the context of HEVC coding. However, the techniques of this disclosure may be applicable to other coding standards or methods.

In the example of FIG. 10, video decoder 30 includes a plurality of functional components. The functional components of video decoder 30 include an entropy decoding module 150, a prediction module 152, an inverse quantization module 154, an inverse transform module 156, a reconstruction module 158, a filter module 159, and a decoded picture buffer 160. Prediction module 152 includes a motion compensation module 162 and an intra prediction module 164. In some examples, video decoder 30 may perform a decoding pass generally reciprocal to the encoding pass described with respect to video encoder 20 of FIG. 9. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding module 150 may perform a parsing operation on the bitstream. As a result of performing the parsing operation on the bitstream, entropy decoding module 150 may extract syntax elements from the bitstream. As part of performing the parsing operation, entropy decoding module 150 may entropy decode entropy encoded syntax elements in the bitstream. Prediction module 152, inverse quantization module 154, inverse transform module 156, reconstruction module 158, and filter module 159 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform an entropy decoding operation, such as a CAVLC decoding operation, on the coded slice header to recover the slice header.

After extracting the slice data from coded slice NAL units, entropy decoding module 150 may extract coded treeblocks from the slice data. Entropy decoding module 150 may then extract coded CUs from the coded treeblocks. Entropy decoding module 150 may perform parsing operations that extract syntax elements from the coded CUs. The extracted syntax elements may include entropy-encoded transform coefficient blocks. Entropy decoding module 150 may then perform entropy decoding operations on the syntax elements. For instance, entropy decoding module 150 may perform CABAC operations on the transform coefficient blocks.

After entropy decoding module 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization module 154 may inverse quantize, i.e., de-quantize, a transform coefficient block associated with the TU. Inverse quantization module 154 may inverse quantize the transform coefficient block in a manner similar to the inverse quantization processes proposed for HEVC or defined by the H.264 decoding standard. Inverse quantization module 154 may use a quantization parameter QP calculated by video encoder 20 for a CU of the transform coefficient block to determine a degree of quantization and, likewise, a degree of inverse quantization for inverse quantization module 154 to apply.

After inverse quantization module 154 inverse quantizes a transform coefficient block, inverse transform module 156 may generate a residual video block for the TU associated with the transform coefficient block. Inverse transform module 156 may apply an inverse transform to the transform coefficient block in order to generate the residual video block for the TU. For example, inverse transform module 156 may apply an inverse DCT, an inverse integer transform, an inverse Karhunen-Loeve transform (KLT), an inverse rotational transform, an inverse directional transform, or another inverse transform to the transform coefficient block.

In some examples, inverse transform module 156 may determine an inverse transform to apply to the transform coefficient block based on signaling from video encoder 20. In such examples, inverse transform module 156 may determine the inverse transform based on a signaled transform at the root node of a quadtree for a treeblock associated with the transform coefficient block. In other examples, inverse transform module 156 may infer the inverse transform from one or more coding characteristics, such as block size, coding mode, or the like. In some examples, inverse transform module 156 may apply a cascaded inverse transform.

If a PU of the CU was encoded using inter prediction, motion compensation module 162 may perform motion compensation to generate a predicted video block for the PU. Motion compensation module 162 may use motion information for the PU to identify a reference sample for the PU. The reference sample of a PU may be in a different temporal picture than the PU. The motion information for the PU may include a motion vector, a reference picture index, and a prediction direction. Motion compensation module 162 may use the reference sample for the PU to generate the predicted video block for the PU. In some examples, motion compensation module 162 may predict the motion information for the PU based on motion information of PUs that neighbor the PU. In this disclosure, a PU is an inter-predicted PU if video encoder 20 uses inter prediction to generate the predicted video block of the PU.

In some examples, motion compensation module 162 may refine the predicted video block of a PU by performing interpolation based on interpolation filters. Identifiers for interpolation filters to be used for motion compensation with sub-sample precision may be included in the syntax elements. Motion compensation module 162 may use the same interpolation filters used by video encoder 20 during generation of the predicted video block of the PU to calculate interpolated values for sub-integer samples of a reference block. Motion compensation module 162 may determine the interpolation filters used by video encoder 20 according to received syntax information and use the interpolation filters to produce the predicted video block.

If a PU is encoded using intra prediction, intra prediction module 164 may perform intra prediction to generate a predicted video block for the PU. For example, intra prediction module 164 may determine an intra prediction mode for the PU based on syntax elements in the bitstream. The bitstream may include syntax elements that intra prediction module 164 may use to predict the intra prediction mode of the PU.

In some instances, the syntax elements may indicate that intra prediction module 164 is to use the intra prediction mode of another PU to predict the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction module 164 may then use the intra prediction mode to generate prediction data (e.g., predicted samples) for the PU based on the video blocks of spatially neighboring PUs.

Reconstruction module 158 may use the residual video blocks associated with TUs of a CU and the predicted video blocks of the PUs of the CU, i.e., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction module 158 reconstructs the video block of the CU, filter module 159 may perform a deblocking operation to reduce blocking artifacts associated with the CU. After filter module 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Figure 11A:
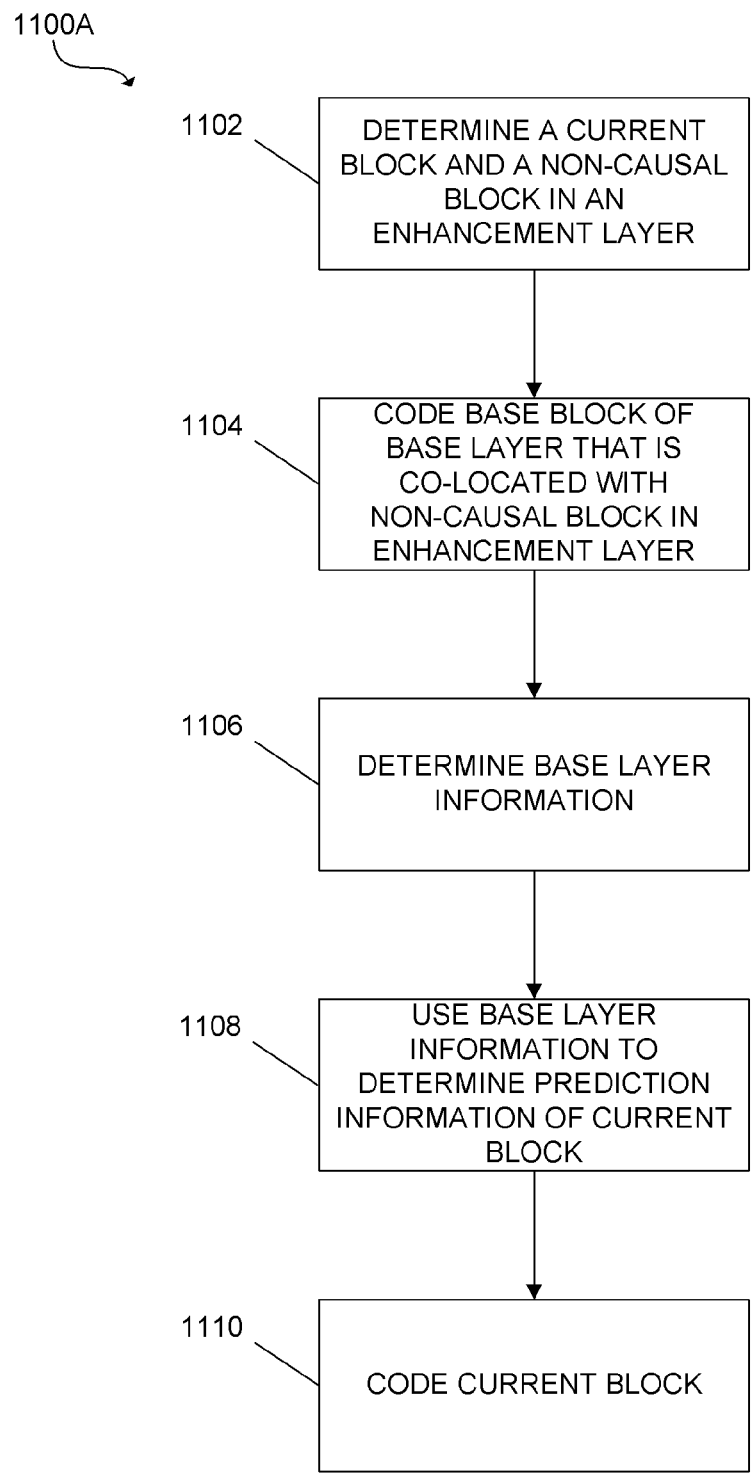
FIG. 11A is a flow diagram that illustrates an example technique for determining prediction information for a current block of an enhancement layer.
Figure 11B:
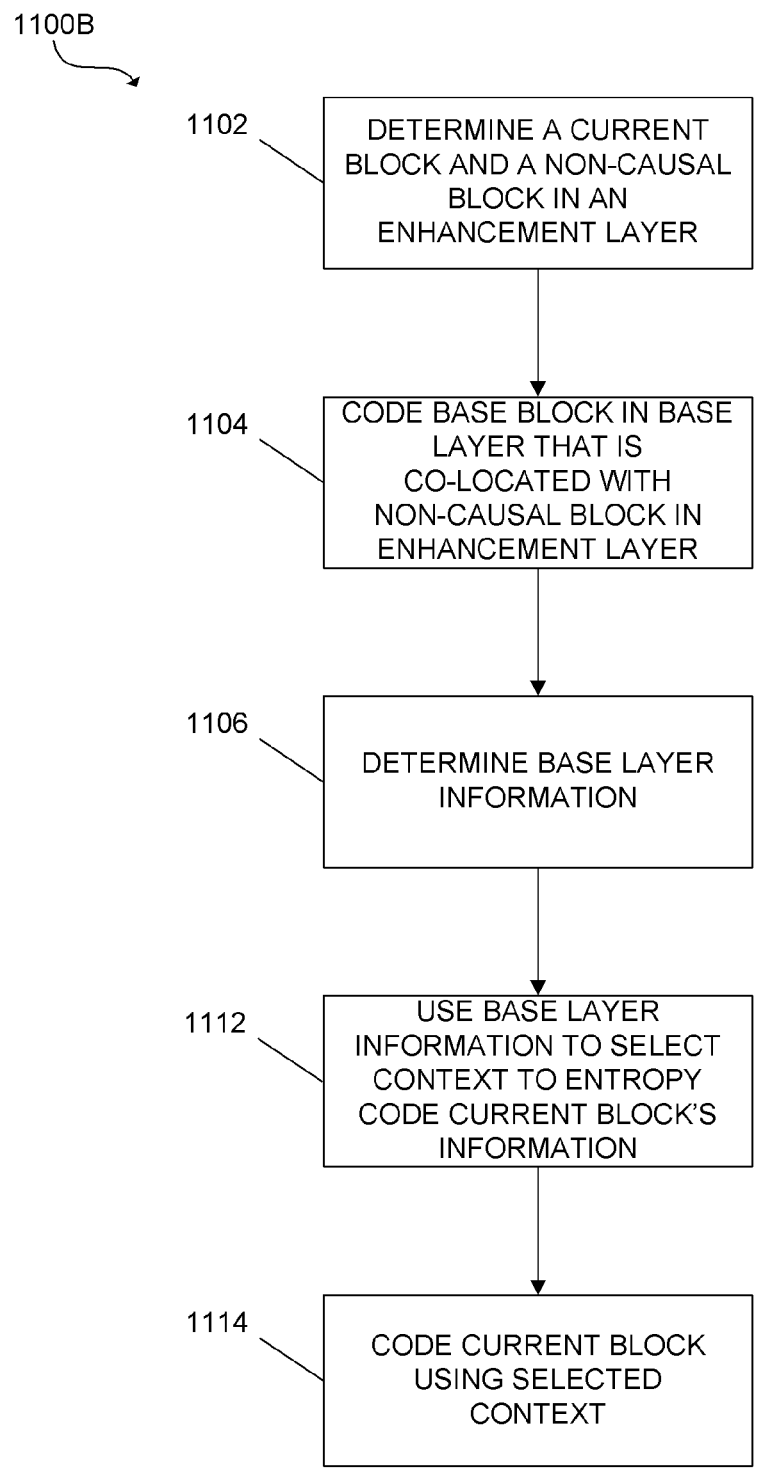
FIG. 11B is a flow diagram that illustrates an example technique for entropy coding a current block of an enhancement layer.

Turning now to FIG. 11A and FIG. 11B, in which like reference numbers refer to like elements, example techniques according to this disclosure are shown. The illustrated techniques and other techniques according to this disclosure may be implemented by a video coding system, such as the example video encoder of FIG. 9 or the example video decoder of FIG. 10. Physical computing hardware (e.g., one or more processors, which may be in communication with one or more memory units and/or other physical computing hardware) may be configured to implement any or all of the example techniques described herein. Additionally, computer-executable instructions for implementing these example techniques and other techniques according to this disclosure may be embodied in a computer-readable medium.

With specific reference to FIG. 11A, an example technique 1100A according to the present disclosure is shown. The example technique 1100A may be implemented to determine prediction information of a current block in an enhancement layer, and may optionally be implemented such that the current block is also coded (e.g., encoded or decoded) based at least in part on the determined prediction information.

At block 1102, the technique may determine which block in an enhancement layer is a current block, and may also determine a non-causal block. As discussed above, an enhancement layer may have a particular coding order in which blocks of the enhancement layer are coded. A current block may be any block for which prediction information may be determined, or any block that is to be coded. A non-causal block may be any block that occurs after the current block in the coding order. In some examples, a non-causal block is a neighbor to the current block (e.g., is immediately spatially adjacent to the current block.

At block 1104, a base block in a base layer may be coded (e.g., encoded or decoded), substantially as discussed above with respect to FIG. 9 and FIG. 10. This base block in the base layer may be co-located with the non-causal block in the enhancement layer identified in block 1102. For example, the base block may occupy a spatial position in the base layer that is substantially similar to a spatial position occupied by the non-causal block in the enhancement layer. However, it will be recognized that the base block and the non-causal block need not occupy exactly the same spatial position; for example, the base block and the enhancement block may have different sizes (e.g. if the base layer and the enhancement layer have different spatial resolutions and/or partitioning modes).

At block 1106, the technique may determine base layer information. In some examples, the base layer information is based on the coding of the base block performed by the technique at block 1104. Base layer information may generally include any video coding information that may be obtained by coding the base layer block. For example, base layer information may include a predicted pixel value of the base layer block; an intra prediction direction of the base layer block; motion information of the base layer block; a partitioning mode of the base block; and/or other information.

At block 1108, the technique may use the base layer information determined in block 1106 to determine prediction information for the current block of the enhancement layer. In one example, the base layer information includes a predicted pixel value of the base layer block. The predicted pixel value of the base layer block may be used to determine prediction information that includes a predicted pixel value of the current block. In another example, base layer information includes the intra prediction direction of the base layer block. This intra prediction direction may be adopted by the current block. In yet another example, the base layer information may include a partitioning mode of the base layer block, which may be used to code the current block. Still other examples are possible.

In some examples, the technique may simply determine prediction information for the current block, without necessarily coding the current block. Accordingly, some implementations of the technique described herein may stop after the prediction information for the current block is determined at block 1108. However, in other examples, the current block is coded based on the prediction information determined in block 1108, as shown by block 1110. The technique may use prediction information determined for the current block to code the current block, substantially as discussed above with respect to FIG. 9 and FIG. 10.

Turning now to FIG. 11B, an example technique 1100B for entropy coding a current block is shown. The example technique 1100B may include the functionality of blocks 1102, 1104, and 1106 discussed above with respect to FIG. 11A. In block 1112, the example technique 1100B may select a context for entropy coding the information of the current block based on the base layer information determined in block 1106. As discussed above, the base layer information may include a predicted pixel value of the base layer block; an intra prediction direction of the base layer block; motion information of the base layer block; a partitioning mode of the base block; and/or other information. A context may be selected for entropy coding the current block, substantially as discussed above with respect to FIG. 9 and FIG. 10. Based on the selected context, the current block may be entropy coded (e.g., entropy encoded or entropy decoded) in block 1114, again as discussed above with respect to FIG. 9 and FIG. 10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Any arrangements of elements, blocks, or functions in the flow diagrams, whether described herein and/or depicted in the attached figures, should be understood as non-limiting examples provided for the purposes of illustrating the principles of the present disclosure. Alternate implementations are included within the scope of the disclosure as well. In such alternate implementations, elements, blocks, or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the elements of which are to be understood as being among other acceptable implementations. All such modifications and variations are intended to be included herein within the scope of this disclosure and protected by the following claims.

What is claimed is:

1. A method of decoding video data, the method comprising:
    identifying, in an enhancement layer comprising a plurality of blocks arranged in a coding order, a current block and a non-causal block, wherein the non-causal block follows the current block in the coding order, wherein the enhancement layer is immediately adjacent to a first reference layer comprising a plurality of blocks and not immediately adjacent to a second reference layer comprising a plurality of blocks;
    identifying, in the second reference layer, a second reference layer block that is co-located with respect to the non-causal block in the enhancement layer, such that the second reference layer block occupies a position in the second reference layer corresponding to a position occupied by the non-causal block in the enhancement layer, wherein a first reference layer block in the first reference layer that is co-located with respect to the non-causal block in the enhancement layer does not have motion information associated therewith;
    generating motion prediction information of the current block based on motion information of the second reference layer block; and
    decoding the current block based on the motion prediction information of the current block.

2. The method of decoding video data of claim 1, further comprising determining sample prediction information of another block in the enhancement layer based on pixel values of the first reference layer block in the first reference layer.

3. The method of decoding video data of claim 1, further comprising determining sample prediction information of another block in the enhancement layer based on an intra prediction direction of the first reference layer block in the first reference layer.

4. The method of decoding video data of claim 3, further comprising adopting the intra prediction direction of the first reference layer block as an intra-prediction direction of the current block.

5. The method of decoding video data of claim 1, further comprising determining the motion prediction information of the current block based on a motion vector of the second reference layer block.

6. The method of decoding video data of claim 5, further comprising means for adopting the motion vector of the second reference layer block as a motion vector of the current block.

7. The method of decoding video data of claim 1, wherein the second reference layer block is coded based on one or more other blocks in the second reference layer.

8. The method of decoding video data of claim 1, wherein the second reference layer has a spatial resolution that is different from a spatial resolution of the enhancement layer.

9. The method of decoding video data of claim 1, wherein the second reference layer is partitioned differently than the enhancement layer.

10. A method of encoding video data, the method comprising:
    identifying, in an enhancement layer comprising a plurality of blocks arranged in a coding order, a current block and a non-causal block, wherein the non-causal block follows the current block in the coding order;
    identifying, in a first reference layer comprising a plurality of blocks, a first reference layer block that is co-located with respect to the non-causal block in the enhancement layer, such that the first reference layer block occupies a position in the base layer that is substantially similar to a position occupied by the non-causal block in the enhancement layer;
    determining whether the first reference layer block has motion information associated therewith;
    in response to a determination that the first reference layer block does not have motion information associated therewith, identifying, in a second reference layer comprising a plurality of blocks, a second reference layer block that is co-located with respect to the non-causal block in the enhancement layer;

generating motion prediction information of the current block based on motion information of the second reference layer block;

encoding the current block based on the motion prediction information of the current block.

11. The method of encoding video data of claim 10, further comprising determining sample prediction information of another block in the enhancement layer based on pixel values of the first reference layer block in the first reference layer.

12. The method of encoding video data of claim 10, further comprising determining sample prediction information of another block in the enhancement layer based on an intra prediction direction of the first reference layer block in the first reference layer.

13. The method of encoding video data of claim 12, further comprising adopting the intra prediction direction of the first reference layer block as an intra-prediction direction of the current block.

14. The method of encoding video data of claim 10, further comprising determining the motion prediction information of the current block based on a motion vector of the second reference layer block.

15. The method of encoding video data of claim 14, further comprising means for adopting the motion vector of the second reference layer block as a motion vector of the current block.

16. The method of encoding video data of claim 10, wherein the second reference layer block is coded based on one or more other blocks in the second reference layer.

17. The method of encoding video data of claim 10, wherein the second reference layer has a spatial resolution that is different from a spatial resolution of the enhancement layer.

18. The method of encoding video data of claim 10, wherein the second reference layer is partitioned differently than the enhancement layer.

19. A video coding device, the video coding device comprising:
   a memory configured to store: video data associated with (i) an enhancement layer comprising a plurality of blocks arranged in a coding order, the plurality of blocks comprising a current block and a non-causal block, wherein the non-causal block follows the current block in the coding order; (ii) a first reference layer comprising a plurality of blocks, wherein the first reference layer is immediately adjacent to the enhancement layer; and (iii) a second reference layer comprising a plurality of blocks, wherein the second reference layer is not immediately adjacent to the enhancement layer; and
   a processor in communication with the memory, the processor configured to:
      identify, in the second reference layer, a second reference layer block that is co-located with respect to the non-causal block in the enhancement layer, wherein a first reference layer block in the first reference layer that is co-located with respect to the non-causal block in the enhancement layer does not have motion information associated therewith;
      generate motion prediction information of the current block based on motion information of the second reference layer block; and
      code the current block based on the motion prediction information of the current block.

20. The video coding device of claim 19, wherein the processor is further configured to determine sample prediction information of another block in the enhancement layer based on pixel values of the first reference layer block in the first reference layer.

21. The video coding device of claim 19, wherein the processor is further configured to determine sample prediction information of another block in the enhancement layer based on an intra prediction direction of the first reference layer block in the first reference layer.

22. The video coding device of claim 21, wherein the processor is further configured to adopt the intra prediction direction of the first reference layer block as an intra-prediction direction of the current block.

23. The video coding device of claim 19, wherein the processor is further configured to determine the motion prediction information of the current block based on a motion vector of the second reference layer block.

24. The video coding device of claim 23, the processor is further configured to adopt the motion vector of the second reference layer block as a motion vector of the current block.

25. The video coding device of claim 19, wherein the processor is further configured to generate a syntax element to encode the current block based at least in part on the motion prediction information of the current block.

26. The video coding device of claim 19, wherein the processor is further configured to process a syntax element to decode the current block based at least in part on the motion prediction information of the current block.

27. A computer program product that comprises one or more non-transitory computer-readable storage media that store instructions that, when executed, cause one or more processors to:
   identify, in an enhancement layer comprising a plurality of blocks arranged in a coding order, a current block and a non-causal block, wherein the non-causal block follows the current block in the coding order, wherein the enhancement layer is immediately adjacent to a first reference layer comprising a plurality of blocks and not immediately adjacent to a second reference layer comprising a plurality of blocks;
   identify, in the second reference layer, a second reference layer block that is co-located with respect to the non-causal block in the enhancement layer, such that the second reference layer block occupies a position in the second reference layer corresponding to a position occupied by the non-causal block in the enhancement layer, wherein a first reference layer block in the first reference layer that is co-located with respect to the non-causal block in the enhancement layer does not have motion information associated therewith;
   generate motion prediction information of the current block based on motion information of the second reference layer block; and
   code the current block based on the motion prediction information of the current block.

28. The computer program product of claim 27, wherein the instructions, when executed, further cause the one or more processors to determine sample prediction information of another block in the enhancement layer based on pixel values of the first reference layer block in the first reference layer.

29. The computer program product of claim 27, wherein the instructions, when executed, further cause the one or more processors to determine sample prediction information of another block in the enhancement layer based on an intra prediction direction of the first reference layer block in the first reference layer.

30. The computer program product of claim 29, wherein the instructions, when executed, further cause the one or more processors to adopt the intra prediction direction of the first reference layer block as an intra-prediction direction of the current block.

31. The computer program product of claim 27, wherein the instructions, when executed, further cause the one or more processors to determine the motion prediction information of the current block based on a motion vector of the second reference layer block.

32. The computer program product of claim 31, wherein the instructions, when executed, further cause the one or more processors to adopt the motion vector of the second reference layer block as a motion vector of the current block.

33. A video coding device for coding a current block of an enhancement layer that comprises the current block and a non-causal block, the video coding device comprising:
 means for identifying, in an enhancement layer comprising a plurality of blocks arranged in a coding order, a current block and a non-causal block, wherein the non-causal block follows the current block in the coding order, wherein the enhancement layer is immediately adjacent to a first reference layer comprising plurality of blocks and not immediately adjacent to a second reference layer comprising a plurality of blocks;
 means for identifying, in the second reference layer, a second reference layer block that is co-located with respect to the non-causal block in the enhancement layer, such that the second reference layer block occupies a position in the second reference layer corresponding to a position occupied by the non-causal block in the enhancement layer, wherein a first reference layer block in the first reference layer that is co-located with respect to the non-causal block in the enhancement layer does not have motion information associated therewith;
 means for generating motion prediction information of the current block based on motion information of the second reference layer block; and
 means for coding the current block based on the motion prediction information of the current block.

34. The video coding device of claim 33, further comprising means for determining sample prediction information of another block in the enhancement layer based on pixel values of the first reference layer block in the first reference layer.

35. The video coding device of claim 33, further comprising means for determining sample prediction information of another block in the enhancement layer based on an intra prediction direction of the first reference layer block in the first reference layer.

36. The video coding device of claim 35, further comprising means for adopting the intra prediction direction of the first reference layer block as an intra-prediction direction of the current block.

37. The video coding device of claim 33, further comprising means for determining the motion prediction information of the current block based on a motion vector of the second reference layer block.

38. The video coding device of claim 37, further comprising means for adopting the motion vector of the second reference layer block as a motion vector of the current block.

* * * * *